(12) United States Patent
Jin et al.

(10) Patent No.: US 9,042,293 B2
(45) Date of Patent: May 26, 2015

(54) COMMUNICATION METHOD USING RELAY STATION IN MOBILE COMMUNICATION SYSTEM

(75) Inventors: Yong Suk Jin, Anyang-si (KR); Ki Seon Ryu, Seoul (KR); Ae Ran Youn, Anyang-si (KR); Du Hyun Mun, Seoul (KR); Beom Joon Kim, Seoul (KR); Seung Hee Han, Seoul (KR); Jeong Ki Kim, Chungcheongnam-do (KR)

(73) Assignee: LG Electronics Inc., Seoul (KR)

( * ) Notice: Subject to any disclaimer, the term of this patent is extended or adjusted under 35 U.S.C. 154(b) by 1841 days.

(21) Appl. No.: 12/097,228

(22) PCT Filed: Dec. 13, 2006

(86) PCT No.: PCT/KR2006/005432
§ 371 (c)(1),
(2), (4) Date: Nov. 10, 2009

(87) PCT Pub. No.: WO2007/069848
PCT Pub. Date: Jun. 21, 2007

(65) Prior Publication Data
US 2010/0046413 A1  Feb. 25, 2010

(30) Foreign Application Priority Data

Dec. 13, 2005 (KR) .................. 10-2005-0122523
Feb. 7, 2006 (KR) .................. 10-2006-0011622
Mar. 2, 2006 (KR) .................. 10-2006-0020139
Apr. 3, 2006 (KR) .................. 10-2006-0030216

(51) Int. Cl.
*H04B 7/14* (2006.01)
*H04W 4/00* (2009.01)
(Continued)

(52) U.S. Cl.
CPC .......... *H04W 72/042* (2013.01); *H04W 84/047* (2013.01); *H04W 88/04* (2013.01)

(58) Field of Classification Search
USPC ............................... 370/315, 329, 330; 455/7
See application file for complete search history.

(56) References Cited

U.S. PATENT DOCUMENTS

2003/0026219 A1* 2/2003 Moon et al. ................... 370/318
2004/0048609 A1* 3/2004 Kosaka ....................... 455/422.1
(Continued)

FOREIGN PATENT DOCUMENTS

CN  1298617  6/2001
EP  1100228  5/2001
(Continued)

OTHER PUBLICATIONS

Tameh, et al., "The Use of Intelligently Deployed Fixed Relays to Improve the Performance of a UTRA-TDD System", IEEE, Oct. 2003, XP010701845.
(Continued)

*Primary Examiner* — Noel Beharry
*Assistant Examiner* — Scott M Sciacca
(74) *Attorney, Agent, or Firm* — Lee, Hong, Degerman, Kang & Waimey

(57) ABSTRACT

A communication method using a relay station (RS) in a mobile communication system is disclosed. A base station transmits identification information, which designates a position of a relay station region during at least one next frame, to a mobile subscriber station through the relay station, and the mobile subscriber station identifies the position of the relay station region during the at least one next frame. Thus, the mobile subscriber station does not need to synchronize with a relay station preamble to retrieve the relay station region for every frame, and a start point of the relay station region can be retrieved quickly and exactly even in the case that the position of the relay station region is varied.

7 Claims, 30 Drawing Sheets

(51) Int. Cl.
*H04W 72/04* (2009.01)
*H04W 84/04* (2009.01)
*H04W 88/04* (2009.01)

(56) References Cited

U.S. PATENT DOCUMENTS

| | | | |
|---|---|---|---|
| 2004/0166860 A1* | 8/2004 | Neufeld et al. | 455/437 |
| 2005/0201325 A1* | 9/2005 | Kang et al. | 370/328 |
| 2006/0035643 A1* | 2/2006 | Vook et al. | 455/450 |
| 2006/0046643 A1* | 3/2006 | Izumikawa et al. | 455/7 |
| 2006/0252367 A1 | 11/2006 | Haartsen | |
| 2007/0049311 A1* | 3/2007 | Lindoff et al. | 455/515 |
| 2007/0058577 A1* | 3/2007 | Rubin | 370/328 |
| 2007/0167994 A1* | 7/2007 | Shelton et al. | 607/60 |
| 2008/0039107 A1* | 2/2008 | Ma et al. | 455/450 |
| 2008/0069031 A1* | 3/2008 | Zhang et al. | 370/328 |
| 2008/0075178 A1* | 3/2008 | Lappetelainen et al. | 375/260 |
| 2008/0188177 A1* | 8/2008 | Tan et al. | 455/11.1 |
| 2009/0041024 A1* | 2/2009 | Steudle et al. | 370/395.3 |
| 2009/0258639 A1* | 10/2009 | Nystrom et al. | 455/422.1 |
| 2009/0262670 A1* | 10/2009 | Cho et al. | 370/280 |

FOREIGN PATENT DOCUMENTS

| | | |
|---|---|---|
| EP | 1100228 A2 | 5/2001 |
| EP | 1575326 | 9/2005 |
| EP | 1677443 A1 | 7/2006 |
| KR | 1020020030075 | 4/2002 |
| KR | 10-2005-0123041 | 12/2005 |
| WO | 2005/067173 | 7/2005 |
| WO | 2005/088871 | 9/2005 |
| WO | 2005096552 | 10/2005 |

OTHER PUBLICATIONS

D. Shiqiang et al., "Recommendation on Design 802.16 TGe PMP mode backward compatible Frame Structure", IEEE 802.16 Broadband Wireless Access Working Group, IEEE C802.16mmr-05/004, Sep. 2005.

Gang Shen et al., "Recommendation on 802.16 MMR with Backward Compatibility", IEEE C802.16mmr-05/023, Nov. 2005.

Ren, et al., "Recommendation on PMP Mode Compatible TDD Frame Structure", IEEE C802.16mmr-05/027r1, Sep. 2005, 16 pages.

IEEE, "IEEE Standard for Local and metropolitan area networks Park 16: Air Interface for Fixed Broadband Wireless Access Systems", IEEE Std 802.16, Oct. 2004, 43 pages.

Canadian Intellectual Property Office Application Serial No. 2,631,421, Office Action dated Mar. 25, 2014, 3 pages.

* cited by examiner

COMMUNICATION METHOD USING RELAY STATION IN MOBILE COMMUNICATION SYSTEM

CROSS-REFERENCE TO RELATED APPLICATIONS

This application is the National Stage filing under 35 U.S.C. §371 of International Application No. PCT/KR2006/005432, filed on Dec. 13, 2006, which claims the benefit of earlier filing date and right of priority to Korean patent application No. 10-2005-0122523, filed on Dec. 13, 2005; Korean patent application No. 10-2006-0011622, filed on Feb. 7, 2006; Korean patent application No. 10-2006-0020139, filed on Mar. 2, 2006; and Korean patent application No. 10-2006-0030216, filed on Apr. 3, 2006.

TECHNICAL FIELD

The present invention relates to a mobile communication system, and more particularly, to a communication method using a relay station (RS) in a mobile communication system.

BACKGROUND ART

FIG. 1 is an explanatory view illustrating a mesh mode communication network. In general, communication can be performed in a broadband wireless access system by using a mesh mode shown in FIG. 1 as well as a point-to-multipoint (hereinafter, referred to as "PMP") mode. The mesh mode allows access to a base station through relay of another subscriber group in order to actively adapt to the metropolitan indirect wave communication environment where a shadow area exists due to large-scaled buildings.

In the mesh mode, a control sub-frame and a data sub-frame are used instead of existing frames. The control sub-frame comprises a network control sub-frame and a schedule control sub-frame to perform two basic functions. In other words, the network control sub-frame serves to make a connection between different systems and maintain such a connection while the schedule control sub-frame serves to perform equivalent scheduling in data transmission between systems. All the frames other than the network control sub-frame generated periodically are schedule control sub-frames, wherein the length of the control sub-frame is represented by a fixed MSH-CTRL-LEN (network descriptor). The network descriptor which is accompanied with network configuration after network entry allocation during the network control and schedule control sub-frames and indicates distributed scheduling during the schedule control sub-frame is generated within a control frame.

Since IEEE 802.16a standard which is one example of the broadband wireless access system considers indirect wave communication in a band of 2-11 GHz, multi-path fading may seriously occur. In this respect, in order to ensure reliability, an automatic retransmission request (ARQ) scheme is adapted to a medium access control (MAC) layer. Also, an advanced antenna system (AAS) is considered to improve coverage of a cell and system capacity through beam forming based on multi-antenna. A dynamic frequency selection (DFS) function is supported to solve a problem relating to a co-existence with other system in an unlicensed band.

In general, a point-to-multipoint (PMP) mode considered in a broadband wireless metropolitan area network (MAN) and a mesh mode can selectively be supported. The mesh mode allows access to a base station through relay of another subscriber group, and is considered for the metropolitan indirect wave communication environment where a shadow area exists due to large-scaled buildings.

FIG. 2 is an explanatory view illustrating a mesh mode frame structure. As shown in FIG. 2, the mesh mode includes a control sub-frame and a data sub-frame instead of existing frames. The control sub-frame is classified into a network control sub-frame and a schedule control sub-frame to perform two basic functions. In other words, the network control sub-frame serves to make a connection between different systems and maintain such a connection while the schedule control sub-frame serves to perform equivalent scheduling in data transmission between systems. All the frames other than the network control sub-frame generated periodically are schedule control sub-frames. A network descriptor, which constitutes a mesh mode network after network entry allocation during the network control sub-frame and performs distributed scheduling during the schedule control sub-frame, generates schedule control frames. The network descriptor means a central mobile subscriber station that can perform a similar function to that of a base station in the mesh mode.

FIG. 3 is an explanatory view illustrating a concept of a sub-channel in an OFDMA physical layer. Properties of the OFDMA physical layer in a broadband wireless access system will be described with reference to FIG. 3. The OFDMA physical layer divides active carriers into groups and transmits the groups to their respective receiver mobile subscriber stations. The groups of the carriers transmitted to the receiver mobile subscriber stations are referred to as sub-channels. In this case, the carriers constituting the respective sub-channels may be adjacent to one another or may be spaced apart from one another at constant intervals. If multiple access is made for the unit of sub-channel, frequency diversity gain and power concentration gain can be obtained, and forward power control can efficiently be performed.

FIG. 4 is an explanatory view illustrating a resource allocation technique in an OFDMA system. Referring to FIG. 4, slots allocated to respective mobile subscriber stations are defined by a two-dimensional data region, and are a set of successive sub-channels allocated by a burst. As shown in FIG. 4, a data region in OFDMA is schematized by a rectangle determined by two-dimensional combination of a time domain and a frequency (sub-channel) domain. The data region may be allocated to a mobile subscriber station for uplink data transmission, and downlink data can be transmitted to a mobile subscriber station through the data region. To define such a data region in a two-dimensional space, the number of OFDM symbols in the time domain and the number of successive sub-channels in a frequency domain are required, wherein the successive sub-channels start from a position spaced apart by offset from a reference point.

FIGS. 5A and 5B are explanatory views illustrating a sub-channel mapping method in uplink and downlink frames. The allocated sub-channel regions are represented by two-dimensions, and data are mapped from the sub-channel of the first symbol for the allocated two-dimensional sub-channel region. In case of the uplink, the allocation region of the allocated sub-channels are first determined by one-dimension. In other words, duration is determined, and the sub-channels are allocated along a symbol axis from the next of the sub-channel previously allocated to a protocol data unit (PDU) burst. In this case, if it reaches the last symbol of the specific sub-channel domain, it continues to allocate the sub-channels from the next sub-channel.

FIG. 6 is an explanatory view illustrating a frame structure of a communication system using OFDMA. As shown in FIG. 6, one frame includes a downlink (DL) frame and an uplink (UL) frame. The first symbol per frame is used as a preamble, and a mobile subscriber station (MSS) acquires a base station (BS) using the preamble. A downlink map (DL-MAP) and an uplink map (UL-MAP) are medium access control (MAC) messages having information as to how a channel resource is allocated to the uplink and downlink. Also, a downlink channel descriptor (DCD) and an uplink channel descriptor (UCD) are MAC messages indicating physical properties (for example, modulation mode and coding mode) of downlink and uplink channels. The mobile subscriber station and the base station transmit and receive data for the unit of burst using the allocated radio resource in accordance with the uplink map and the downlink map.

FIG. 7 is an explanatory view illustrating a burst allocation scheme. Referring to FIG. 7, two-dimensional blocks for time axis and frequency axis are allocated for a burst in the downlink. In other words, the downlink map includes a start symbol number, a start sub-channel number, the number of used symbols, and the number of used sub-channels. Accordingly, it is noted from the downlink map how the radio resource has been allocated on the frame. Meanwhile, in case of the downlink, the radio resources are sequentially allocated in accordance with a symbol axis corresponding to the first sub-channel and then the radio resources corresponding to the next sub-channel in accordance with the symbol axis are allocated. Accordingly, the uplink map can identify the allocated radio resources through the number of the allocated symbols.

FIG. 8 is a flow chart illustrating network access procedures of a mobile subscriber station in a PMP mode. Referring to FIG. 8, if the power is turned on, the mobile subscriber station scans downlink channels and acquires up/down synchronization with the base station (S41). The mobile subscriber station performs ranging with the base station to adjust an uplink transmission parameter, and is assigned with a basic management connection identifier (CID) and a primary management CID from the base station (S42). The mobile subscriber station performs negotiation with the base station regarding basic performance (S43), and performs authentication procedure (S44). If the mobile subscriber station is registered in the base station, the mobile subscriber station managed by IP is assigned with a secondary management CID from the base station to set IP connection (S45). The mobile subscriber station sets the current date and time (S46), downloads its configuration file from a server (S47), and establishes service connection (S48).

FIG. 9 is a flow chart illustrating a ranging procedure. Referring to FIG. 9, the base station transmits initial ranging information element (IE) having a broadcasting CID by using the downlink map (UL-MAP) message (S51). The mobile subscriber station transmits ranging packets by using a ranging request message (RNG-REQ) in a connection mode state (S52). In the case that the base station receives the ranging packets that cannot be decoded, the base station transmits a ranging response message (RNG-RSP) including a frame number and retry frame information to the mobile subscriber station (S53). If the mobile subscriber station receives the frame number and the retry frame information, the mobile subscriber station adjusts parameters and transmits the ranging request message (RNG-REQ) on the basis of the retry frame information (S54). If the base station receives the ranging packets that can be decoded, the base station transmits a ranging response message (RNG-RSP) including basic management CID (S55). If the mobile subscriber station receives the ranging request message including its MAC address, the mobile subscriber station stores the basic management CID and adjusts other parameters. The base station transmits an initial ranging information element to the mobile subscriber station by using the basic CID of the uplink map message (S56). The base station recognizes its basic CID from the uplink map message, and transmits the ranging request message in response to initial ranging opportunity poll (S57). The base station transmits the ranging response message in response to the ranging request message (S58). The mobile subscriber station which has received the ranging response message adjusts local parameters.

The downlink map (DL-MAP) message defines usage allocated per burst for a downlink duration in a burst mode physical layer while the uplink map (UL-MAP) message defines usage of the burst allocated for an uplink duration.

Table 1 illustrates an example of a downlink map information element.

TABLE 1

| Syntax | Size | Notes |
|---|---|---|
| DL-MAP_Message_Format( ) { | | |
| Management Message Type = 2 | 8 bits | |
| PHY Synchronization Field | variable | See appropriate PHY specification. |
| DCD Count | 8 bits | |
| Base Station ID | 48 bits | |
| Begin PHY Specific Section { | | See applicable PHY section. |
| for(i= 1; I <= n;i++) { | | For each DL-MAP element 1 to n. |
| DL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

Table 2 illustrates an example of the uplink map (UL-MAP) message.

TABLE 2

| Syntax | Size | Notes |
|---|---|---|
| UL-MAP_IE( ) { | | |
| CID | 16 bits | |
| UIUC | 4 bits | |
| if (UIUC == 12) { | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00 - Initial Ranging/Handover Ranging over two symbols 0b01 - Initial Ranging/Handover Ranging over four symbols 0b10 - BW Request/Periodic Ranging over one symbol 0b11 - BW Request/Periodic Ranging over three symbols |
| Reserved | 1 bit | Shall be set to zero |
| } else if (UIUC == 14) { | | |
| CDMA_Allocation_IE( ) | 32 bits | |
| else if (UIUC == 15) { | | |
| Extended UIUC dependent IE | Variable | See clauses following 8.4.5.4.3 |
| } else { | | |
| Duration | 10 bits | In OFDMA slots (see 8.4.3.1) |
| Repetition coding indication | 2 bits | 0b00 - No repetition coding 0b01 - Repetition coding of 2 used 0b10 - Repetition coding of |

TABLE 2-continued

| Syntax | Size | Notes |
|---|---|---|
|  |  | 4 used 0b11 - Repetition coding of 6 used |
| } |  |  |
| Padding nibble, if needed | 4 bits | Completing to nearest byte, shall be set to 0. |
| } |  |  |

The information element constituting DL-MAP includes downlink interval usage code (DIUC), a connection ID (CID), and a burst position information (sub-channel offset, a symbol offset, the number of sub-channels, and the number of symbols). A downlink traffic duration corresponding to each mobile subscriber station is divided by the information element. Meanwhile, the information element constituting UL-MAP message defines usage per CID by using uplink interval usage code (UIUC) and determines the position of a corresponding duration by using a 'duration' field. In this case, usage per duration is determined by a UIUC value used in the UL-MAP, wherein each of duration starts from a point far away from a previous IE start point by 'duration' determined by the UL-MAP IE.

Table 3 illustrates an example of the DL-MAP IE.

TABLE 3

| Syntax | Size | Notes |
|---|---|---|
| DL-MAP_IE( ) { |  |  |
| DIUC | 4 bits |  |
| if (DIUC == 15) { |  |  |
| Extended DIUC dependent IE | variable | See clauses following 8.4.5.3.1 |
| } else { |  |  |
| if (INC_CID == 1) { |  | The DL-MAP starts with INC_CID = 0. INC_CID is toggled between 0 and 1 by the CID-SWITCH_IE( ) (8.4.5.3.7) |
| N_CID | 8 bits | Number of CIDs assigned for this IE |
| for (n=0; n< N_CID; n++) { |  |  |
| CID | 16 bits |  |
| } |  |  |
| } |  |  |
| OFDMA Symbol offset | 8 bits |  |
| Subchannel offset | 6 bits |  |
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 7 bits |  |
| No. Subchannels | 6 bits |  |
| Repetition Coding Indication | 2 bits | 0b00 - No repetition coding 0b01 - Repetition coding of 2 used 0b10 - Repetition coding of 4 used 0b11 - Repetition coding of 6 used |
| } |  |  |
| } |  |  |

Table 4 illustrates an example of the uplink map information element.

TABLE 4

| Syntax | Size | Notes |
|---|---|---|
| UL-MAP_IE( ) { |  |  |
| CID | 16 bits |  |
| UIUC | 4 bits |  |
| if (UIUC == 12) { |  |  |
| OFDMA Symbol offset | 8 bits |  |
| Subchannel offset | 7 bits |  |
| No. OFDMA Symbols | 7 bits |  |
| No. Subchannels | 7 bits |  |
| Ranging Method | 2 bits | 0b00 - Initial Ranging/Handover Ranging over two symbols 0b01 - Initial Ranging/Handover Ranging over four symbols 0b10 - BW Request/Periodic Ranging over one symbol 0b11 - BW Request/Periodic Ranging over three symbols |
| Reserved | 1 bit | Shall be set to zero |
| } else if (UIUC == 14) { |  |  |
| CDMA_Allocation_IE( ) | 32 bits |  |
| else if (UIUC == 15) { |  |  |
| Extended UIUC dependent IE | Variable | See clauses following 8.4.5.4.3 |
| } else { |  |  |
| Duration | 10 bits | In OFDMA slots (see 8.4.3.1) |

TABLE 4-continued

| Syntax | Size | Notes |
|---|---|---|
| Repetition coding indication | 2 bits | 0b00 - No repetition coding 0b01 - Repetition coding of 2 used 0b10 - Repetition coding of 4 used 0b11 - Repetition coding of 6 used |
| } | | |
| Padding nibble, if needed | 4 bits | Completing to nearest byte, shall be set to 0. |
| } | | |

The uplink duration defined by UIUC 12 is allocated for initial ranging, handover ranging, periodical ranging or band request, and has a competition-based characteristic.

As shown in Table 4, the information element constituting the UL-MAP message defines usage per CID by using the uplink interval usage code (UIUC) and determines the position of a corresponding duration by using a 'duration' field. In this case, usage per duration is determined by a UIUC value used in the UL-MAP, wherein each of duration starts from a point far away from a previous IE start point by 'duration' determined by the UL-MAP IE.

For a mobile communication system including a broadband wireless access system, a relay station has been suggested to improve throughput or eliminate a shadow area, wherein the relay station serves to relay signals between the base station and the mobile subscriber station (MSS). In other words, the relay station serves to transmit the signals from the base station to the mobile subscriber station in case of the downlink while the relay station serves to transmit the signals from the mobile subscriber station to the base station in case of the uplink. The relay station may be fixed to a specific area or may be used as a semi-fixed type. Also, the relay station may be used as a mobile type by being installed in a public transportation means.

The relay station can be used for enlargement of service coverage of the base station and improvement of throughput. The operation of the relay station can depend on its usage.

In the case that the relay station is used for enlargement of service coverage of the base station (Type 1), the relay station relays all the control messages, which are transmitted from the base station or a mobile subscriber station, as well as data transmitted and received between the mobile subscriber station and the base station. In the case that the relay station is used for improvement of throughput (Type 2), the relay station relays user data only exchanged between the mobile subscriber station and the base station, and allows the mobile subscriber station and the base station to directly exchange a broadcasting type control message of the base station or an uplink control message of the mobile subscriber station with each other. The data relayed by the relay station may be delayed in comparison with the case where the mobile subscriber station and the base station directly exchange the data with each other. The relay station provides good signal quality to the mobile subscriber station where data are relayed, and relays the data to the corresponding mobile subscriber station by using a proper channel coding rate and a proper modulation mode, thereby improving total throughput.

However, the mobile communication system provided with the relay station has a problem in that the system fails to suggest how to perform scheduling and allocate a resource between the base station and the relay station and between the relay station and the mobile subscriber station. Also, in the OFDMA based mobile communication system, if relay communication is performed by the relay station, a problem relating to how to allocate a radio resource and how to transmit radio resource allocation information occurs.

In view of the technical aspect, the relay station can be divided into two types. First, the relay station simply amplifies (amplifies only the intensity of signal) a signal received from a transmitting mobile subscriber station and transmits the amplified signal to a receiving mobile subscriber station in an analog mode. In this case, since delay little occurs and the relay station has an amplification function only, it is advantageous in view of cost efficiency. However, a problem occurs in that noise may be amplified when the signal is amplified. Second, the relay station decodes the signal received from the transmitting mobile subscriber station and then encodes the decoded signal to transmit the encoded signal to the receiving mobile subscriber station. In this case, noise can be removed and high throughput can be obtained by a higher data rate coding mode. However, a problem still occurs in that delay may occur during decoding and encoding.

In the frame structure of the aforementioned related art mobile communication system, the mobile subscriber station which receives service from the base station cannot recognize the exact start position of the downlink and uplink regions of the relay station with only information received from the relay station. Accordingly, the mobile subscriber station should synchronize with the relay station per frame through RS-preamble. For example, if the position of the relay station region is changed by the base station, the mobile subscriber station has difficulty in recognizing the relay station region. Even though the mobile subscriber station recognizes the relay station region, error in transmission and reception may occur between the mobile subscriber station and the base station as the mobile subscriber station incorrectly recognizes the relay station region.

DISCLOSURE OF THE INVENTION

Accordingly, the present invention is directed to a communication method using a relay station in a mobile communication system, which substantially obviates one or more problems due to limitations and disadvantages of the related art.

An object of the present invention is to provide a communication method using a relay station in a mobile communication system, in which data are efficiently relayed and transmitted from a base station to a mobile subscriber station by using the relay station.

Another object of the present invention is to provide a communication method using a relay station in a mobile communication system, in which a radio resource is allocated more efficiently and relay communication is performed using the radio resource.

Another object of the present invention is to provide a communication method using a relay station and a frame structure therefor, in which a communication resource is efficiently allocated in the case that communication is performed between a base station and a mobile subscriber station through the relay station.

Another object of the present invention is to provide a method for designating and retrieving a relay station region in a mobile communication system, in which a mobile subscriber station can recognize the position of the relay station region quickly and exactly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a relay method for data transmission in a method for allocating a radio resource from a base station in a communication system provided with a relay station (RS), the relay method comprises transmitting a radio resource allocation message including first information and second information, the first information relating to radio resource allocation for transmitting data from the base station to the relay station by using an nth frame, and the second information relating to radio resource allocation for transmitting data from the relay station to a mobile subscriber station by using an (n+k)th frame, and transmitting data from the base station to the relay station during the nth frame by using the radio resource allocated in accordance with the first information.

In another aspect of the present invention, in a method for relaying data transmitted from a base station to a mobile subscriber station through a relay station (RS) in a communication system provided with the relay station, the method comprises receiving a radio resource allocation message including first information and second information, the first information relating to radio resource allocation for transmitting data from the base station to the relay station by using an nth frame, and the second information relating to radio resource allocation for transmitting data from the relay station to a mobile subscriber station by using an (n+k)th frame, receiving data transmitted from the base station during the nth frame by using the radio resource allocated in accordance with the first information, decoding the data, encoding the decoded data, and transmitting the data to the mobile subscriber station during the (n+k)th frame by using the radio resource allocated in accordance with the second information.

In another aspect of the present invention, in a relay communication method using a relay station to relay data transmission from a base station to a mobile subscriber station, the relay communication method comprises receiving data from the base station by using an allocated downlink radio resource during a first frame, transmitting downlink radio resource allocation information to mobile subscriber stations within a zone of the relay station by using a downlink map of a second frame, respectively transmitting data to the mobile subscriber stations within the relay station zone during the second frame by using a radio resource according to the radio resource allocation information.

In another aspect of the present invention, in a relay communication method using a relay station to relay data transmission from a base station to a mobile subscriber station, the relay communication method receiving data from the base station during a first frame, transmitting radio resource allocation information for sub-frame of a second frame to the base station during the first frame, transmitting radio resource allocation information of the sub-frame to mobile subscriber stations within a region, and transmitting the data to the mobile subscriber stations within the region by using a radio resource according to the radio resource allocation information.

The relay station performs initialization, i.e., initial network entry, in the same manner as a mobile subscriber station when it first enters a cell of the base station. The base station determines whether to provide services to mobile subscriber stations subscribed to the base station, through the relay station or to directly communicate with the mobile subscriber stations, and transmits data to the mobile subscriber stations through the relay station if communication is required through the relay station.

In the present invention, in the case that communication between the base station and the mobile subscriber station is relayed through the relay station in an OFDM or OFDMA communication system, a frame structure for transmitting and receiving data from the base station to the mobile subscriber station through the relay station is defined. In other words, in the case that there exists a mobile subscriber station which performs relay through the relay station, the base station in advance allocates a resource for transmitting and receiving between the relay station and the mobile subscriber station to the corresponding relay station so as to notify downlink/uplink map (DL/UL-MAP) information for the relay station in a data burst mode of the relay station. The downlink/uplink map (DL/UL-MAP) information for the mobile subscriber station for transmitting and receiving service of the base station through the relay station may be transmitted from the base station to the corresponding relay station or the DL/UL-MAP information of all the relay stations may be transmitted through a single burst. The DL/UL-MAP information is broadcasted for a corresponding region of the downlink of the relay station which has received the DL/UL-MAP information through the data burst, and the data of the mobile subscriber station are transmitted and received through a frame number designated by the base station and the corresponding position.

In another aspect of the present invention, in a communication method through a relay station (RS) in an OFDM/OFDMA mode communication system, the communication method comprises the base station allocating a relay station region through which the relay station transmit or receive data to/from at least one mobile subscriber station, the base station transmitting downlink/uplink map (DL/UL-MAP) information for the relay station through a data burst region, and the relay station transmitting downlink data to the at least one mobile subscriber station through the relay station region in accordance with the downlink/uplink map information received through the data burst region.

In another aspect of the present invention, in a communication method in a mobile subscriber station through a relay station (RS) in an OFDM/OFDMA mode communication system, the communication method comprises receiving data through a downlink data burst region allocated through downlink map (DL-MAP) information for the relay station among a relay station region allocated for the mobile subscriber station from the relay station to transmit and receive data, and transmitting the data through an uplink data burst region allocated through uplink map (UL-MAP) information for the relay station, wherein the downlink/uplink map (DL/UL-MAP) information for the relay station is transmitted from the base station to the relay station through the data burst region.

In another aspect of the present invention, in a frame structure for performing communication through at least one relay station between a base station and at least one mobile subscriber station in an OFDM or OFDMA mode communication system, the frame structure comprises a preamble region including a message indicating a relay station region for allowing the at least one relay station to transmit and receive data for the at least one mobile subscriber station, a data burst region to which downlink/uplink map (DL/UL-MAP) information for the at least one relay station is allocated, and the relay station region designated by the message and allocated to allow the at least one relay station to transmit and receive the data for the at least one mobile subscriber station.

In the present invention, the base station transmits identification information, which designates a position of the relay station region during at least one next frame, to the mobile subscriber station through the relay station, and the mobile subscriber station identifies the position of the relay station region during the at least one next frame. Thus, the mobile subscriber station does not need to synchronize with the relay station preamble to retrieve the relay station region for every frame, and the start point of the relay station region can be retrieved quickly and exactly even in the case that the position of the relay station region is varied.

In another aspect of the present invention, in a method for designating a relay station region in a mobile communication system, which performs communication between a base station and at least one mobile subscriber station through a relay station, the method comprises transmitting a first message including identification information from the base station to the relay station, the identification information designating a position of a relay station region during at least one next frame, and transmitting a second message including the identification information from the relay station to the at least one mobile subscriber station through a relay station region of a current frame.

In another aspect of the present invention, in a method for retrieving a relay station region in a mobile communication system, which performs communication between a base station and at least one mobile subscriber station through a relay station, the method comprises receiving a message including identification information from the relay station, the identification information designating a position of a relay station region during at least one next frame through a relay station region of a current frame, and retrieving a start point of the relay station region of the at least one next frame by using the identification information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The aforementioned advantages, objects, and features of the invention will become apparent through the appended drawings and the following description of the invention. Hereinafter, reference will now be made in detail to the preferred embodiments of the present invention, examples of which are illustrated in the accompanying drawings.

Unlike an access pointer (AP) of a wireless LAN or a base station (BS) of a mobile communication system is connected with a cable backbone network, a relay station (RS) can communicate with a base station or a mobile subscriber station in a wireless mode. Also, unlike an amplifier which amplifies a received signal only, the relay station can amplify a received signal, decode the signal, and encode the decoded signal to transmit the signal to the mobile subscriber station or the base station during next frame.

In the mobile communication system, the relay station can be used for various purposes. For example, the relay station may simply amplify the signal transmitted from the base station to re-transmit the amplified signal to the mobile subscriber station, or may decode the signal received from the base station and encode the decoded signal to transmit the encoded signal to the mobile subscriber station. In the case that the relay station simply amplifies the signal and transmits the amplified signal, there is no delay time required to transmit the signal transmitted from the base station to the mobile subscriber station. In other words, the signal can be transmitted within one frame. However, a problem occurs in that received noise may be amplified when the signal is amplified.

Meanwhile, in the case that the relay station transmits the signal transmitted from the base station to the mobile subscriber station after decoding the signal and then encoding the decoded signal, delay time equal to or greater than at lease one frame may be caused by decoding and encoding. However, as the relay station encodes the signal received from the base station and then transmits the encoded signal, better signal quality can be obtained.

The relay station can use frequency bands as follows. The relay station may use a frequency band used by the base station and an independent frequency band. Also, the relay station may use some of the frequency band used by the base station. Moreover, the relay station may use the same frequency band as that of the base station, amplify a control signal or data received from the base station, and retransmit the amplified signal or data. Meanwhile, examples of the relay station include a fixed relay station, a nomadic relay station, and a mobile relay station.

Figure 1:
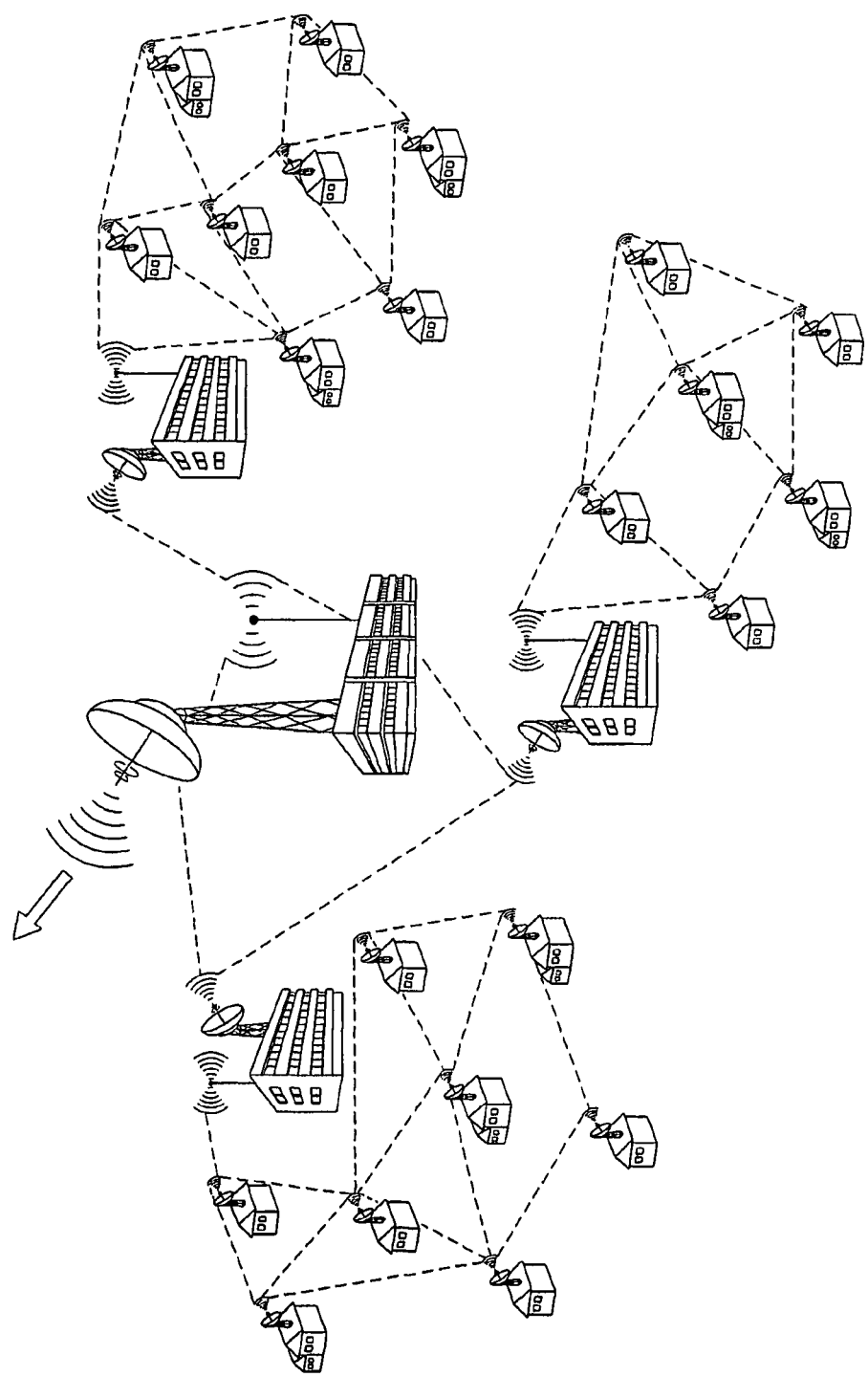
FIG. 1 is an explanatory view illustrating a mesh mode communication network.
Figure 2:
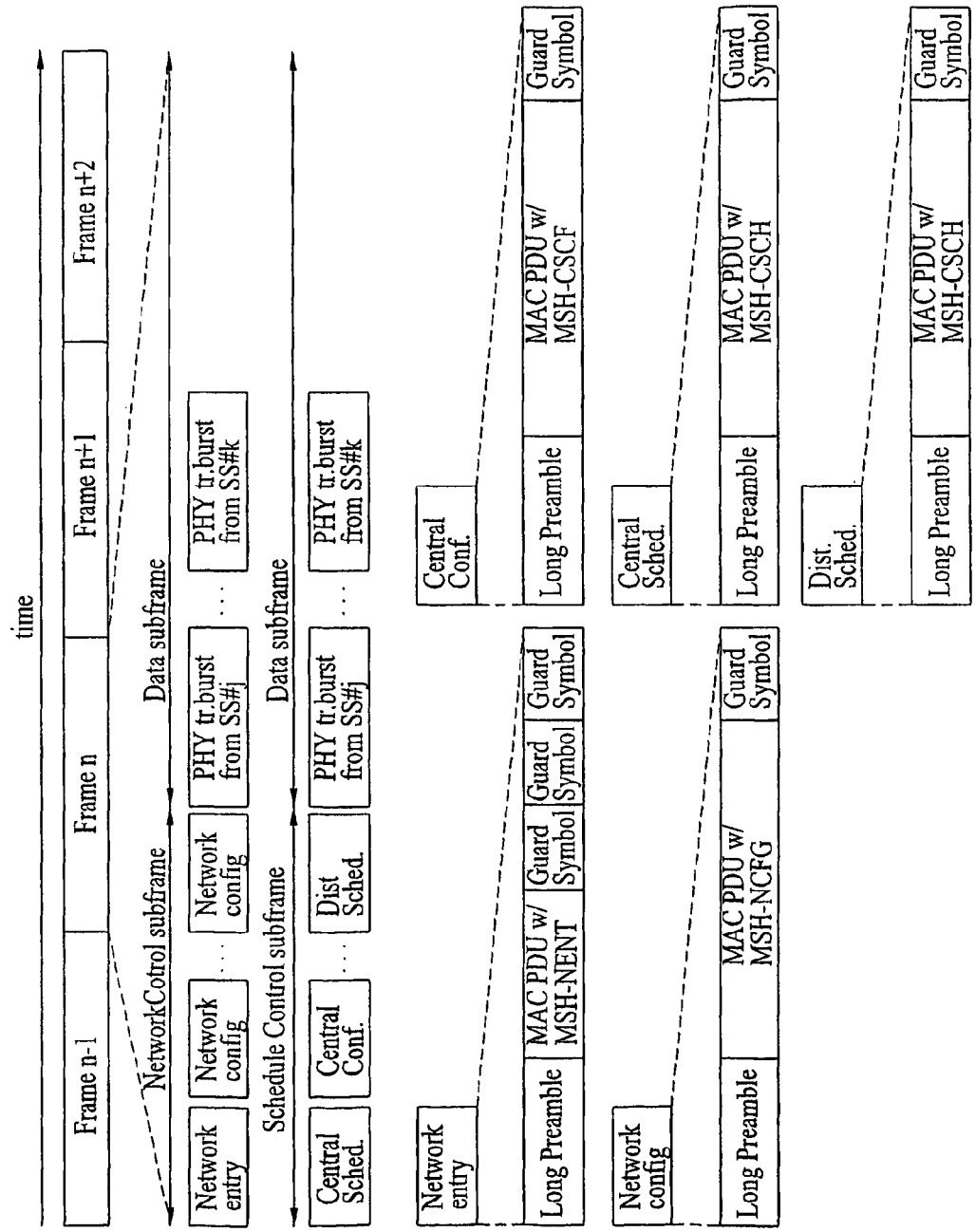
FIG. 2 is an explanatory view illustrating a mesh mode frame structure.
Figure 3:
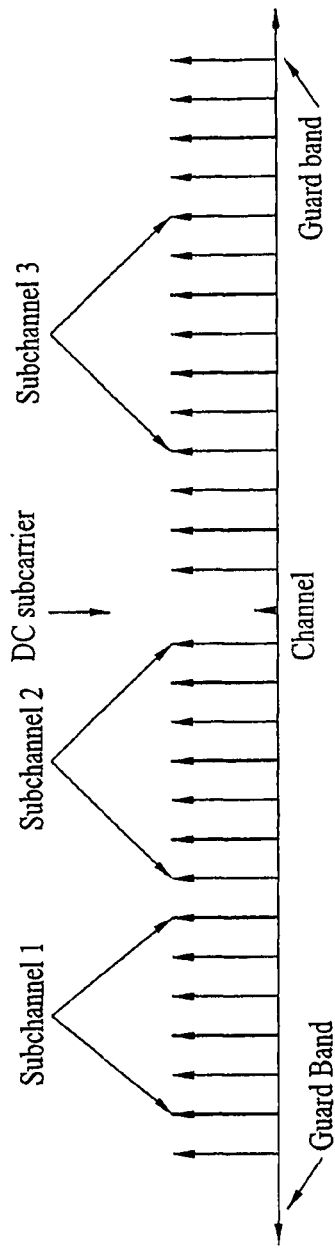
FIG. 3 is an explanatory view illustrating a concept of a sub-channel in an OFDMA physical layer.
Figure 4:
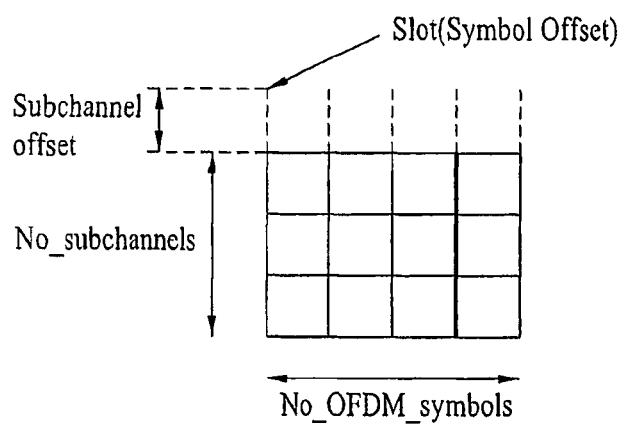
FIG. 4 is an explanatory view illustrating a resource allocation mode in OFDMA.
Figure 5A:
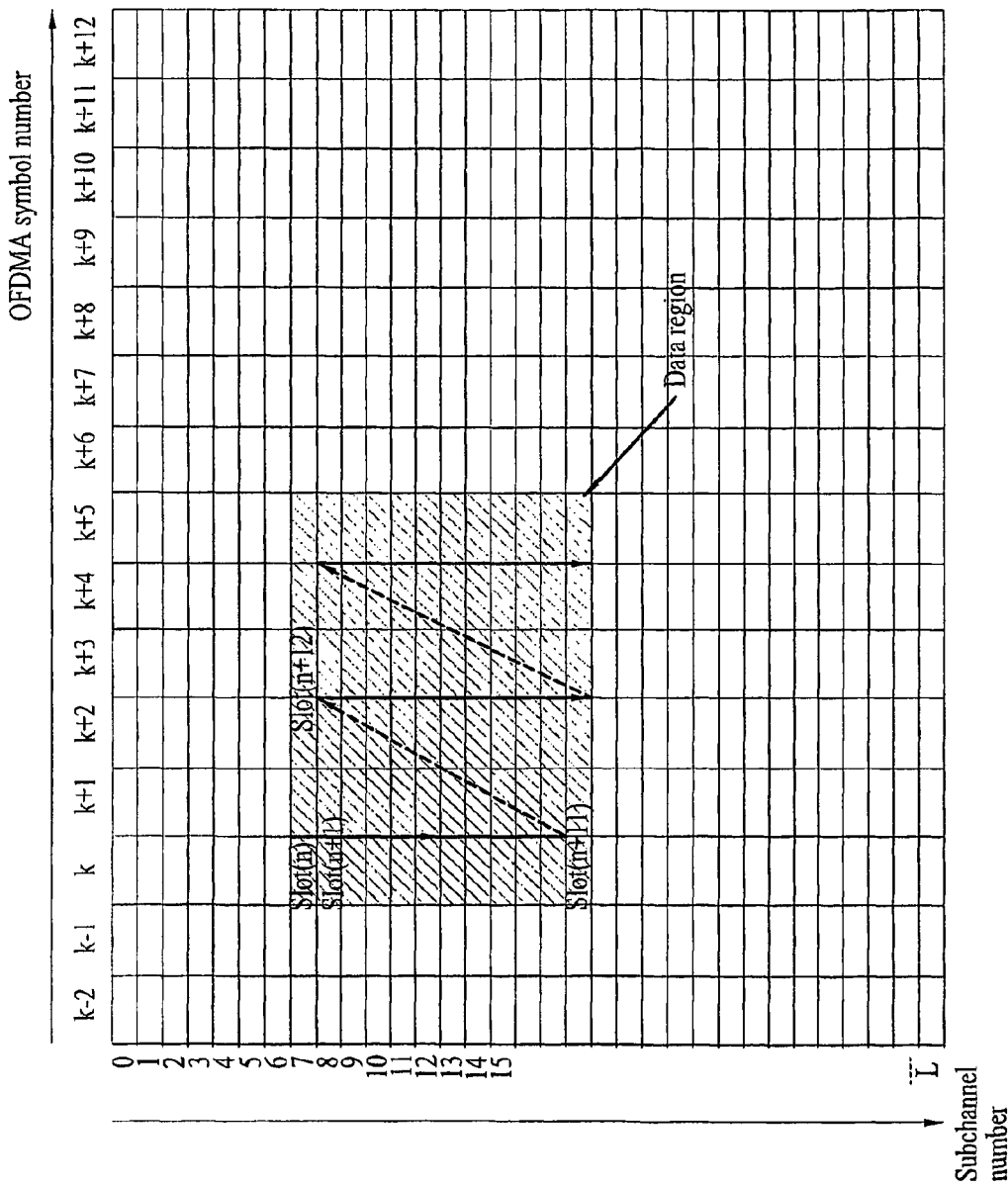
FIGS. 5A and 5B are explanatory views illustrating a sub-channel mapping method in downlink and uplink frames.
Figure 5B:
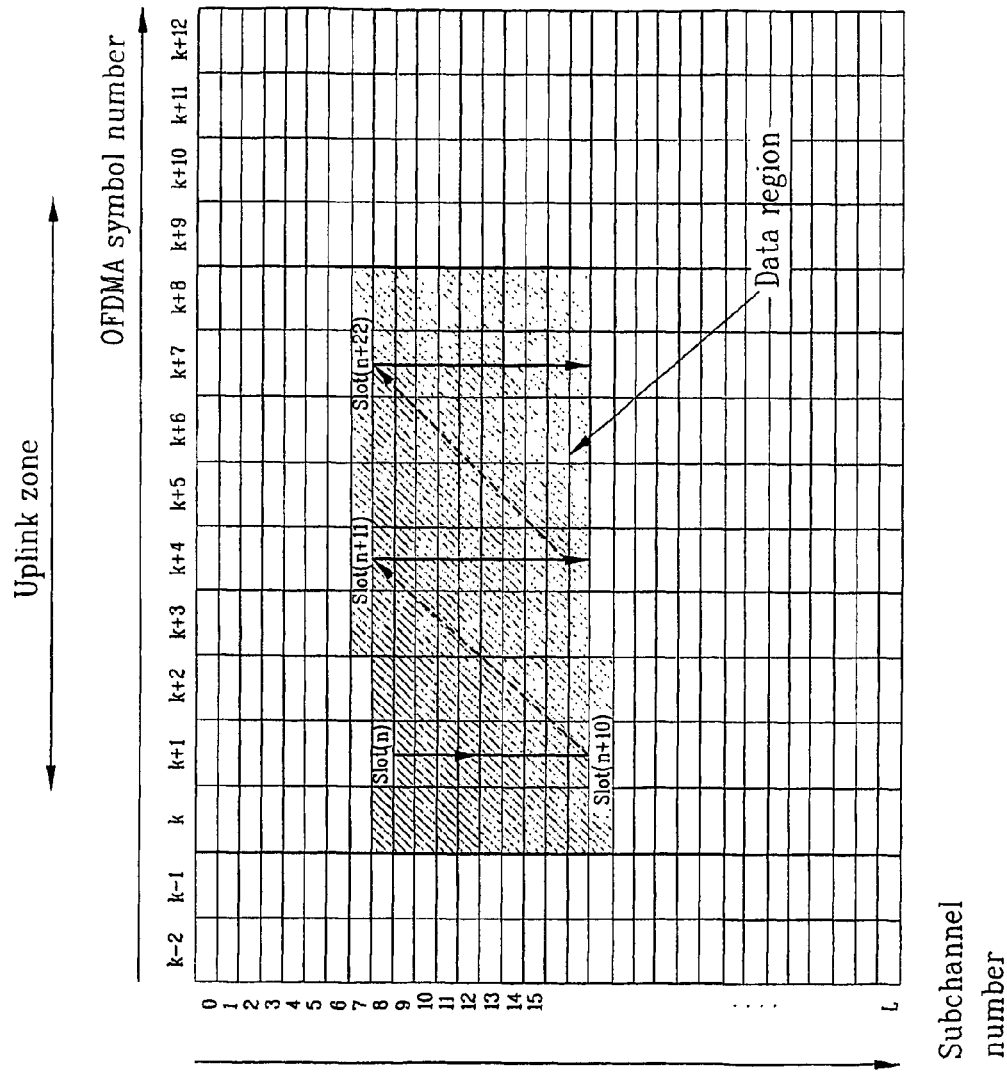
Figure 6:
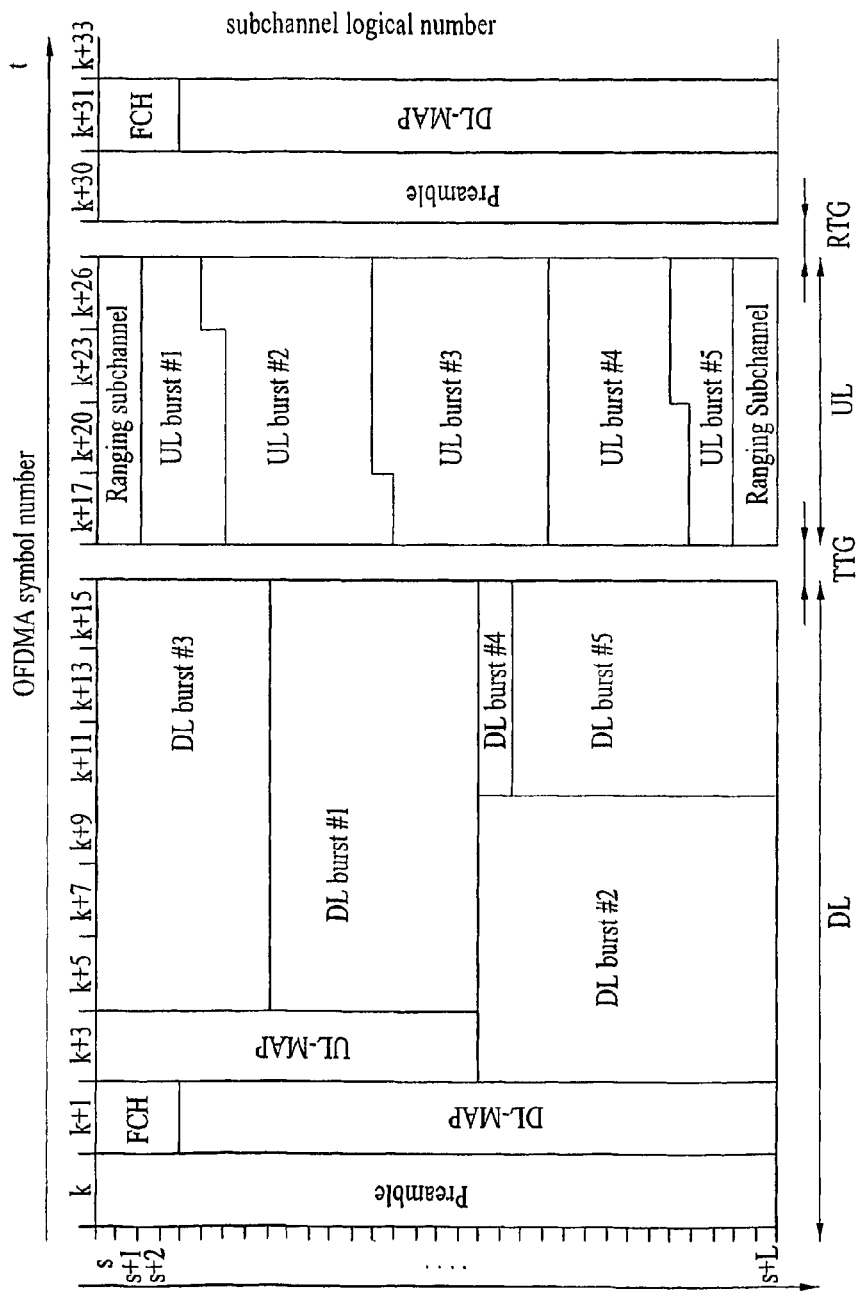
FIG. 6 is an explanatory view illustrating a frame structure of a mobile communication system using OFDMA.
Figure 7:
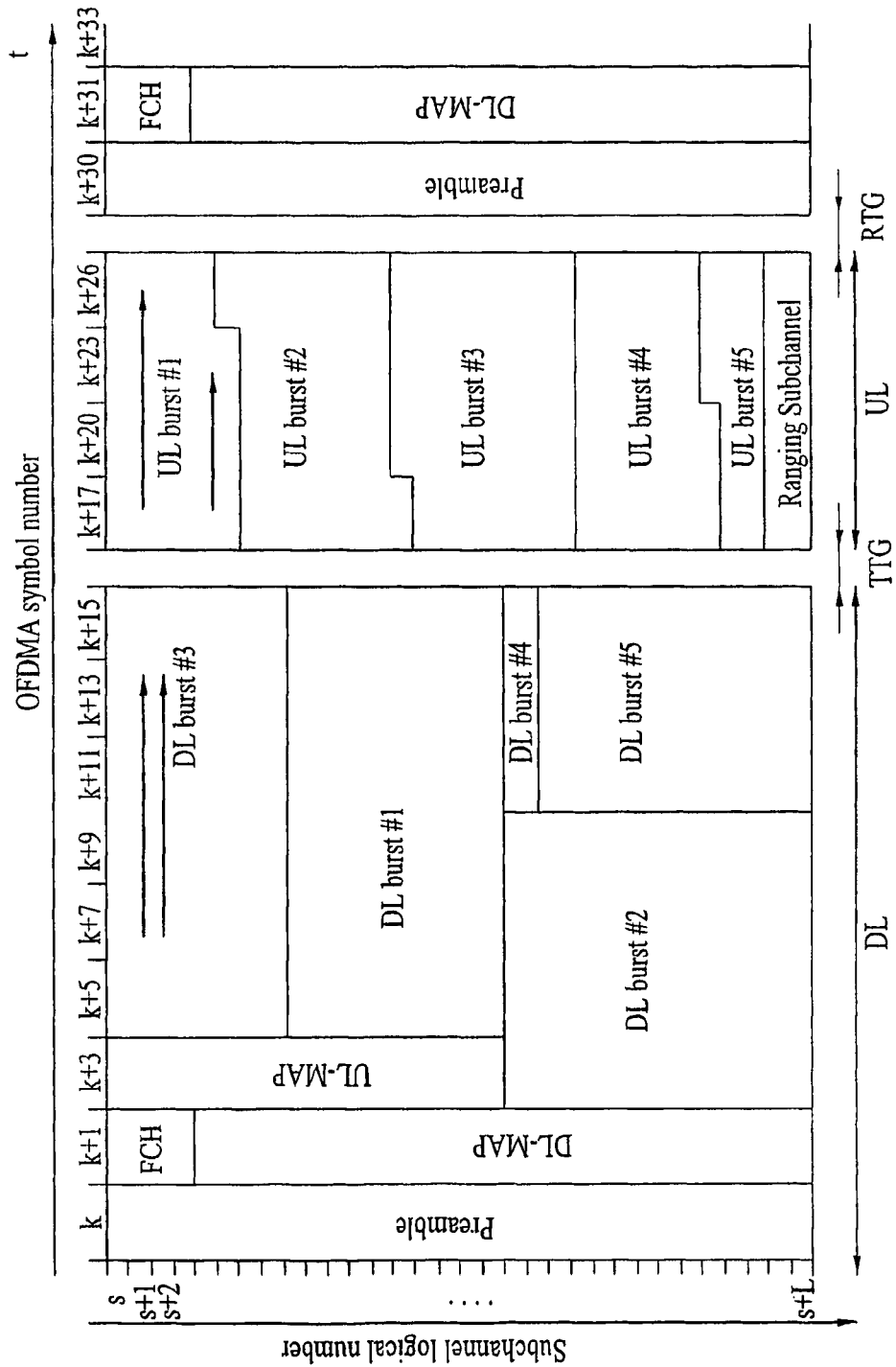
FIG. 7 is an explanatory view illustrating a burst allocation method.
Figure 8:
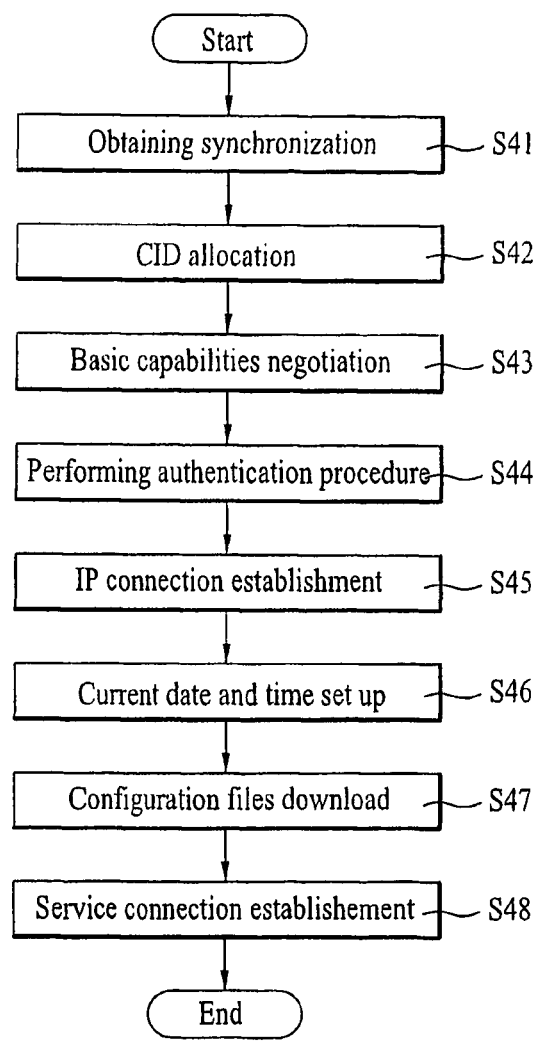
FIG. 8 is a flow chart illustrating network access steps of a mobile subscriber station in a PMP mode.
Figure 9:
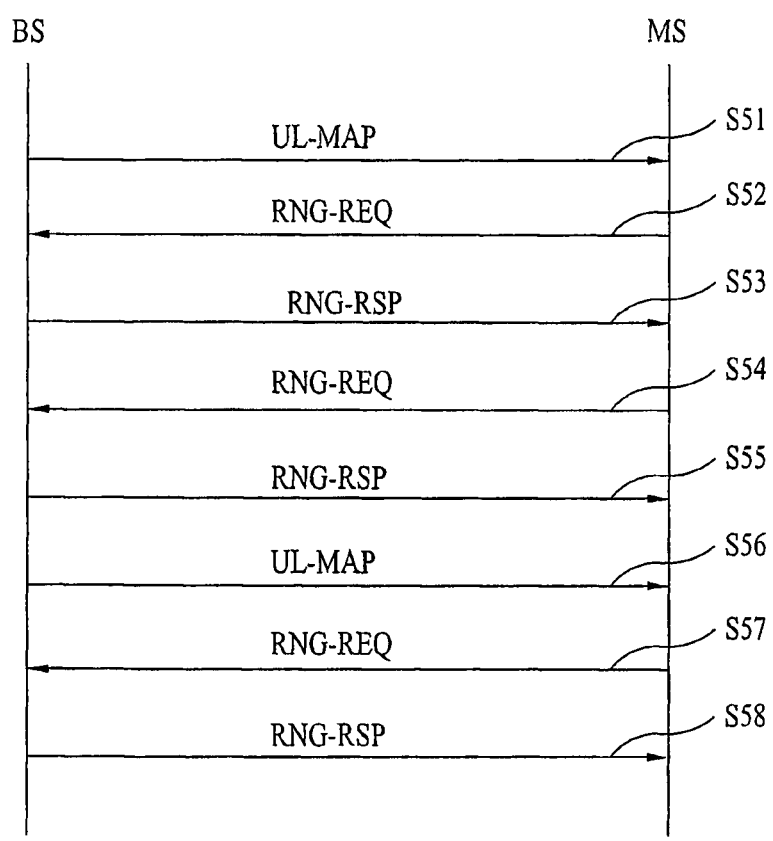
FIG. 9 is a flow chart illustrating ranging steps.
Figure 10:
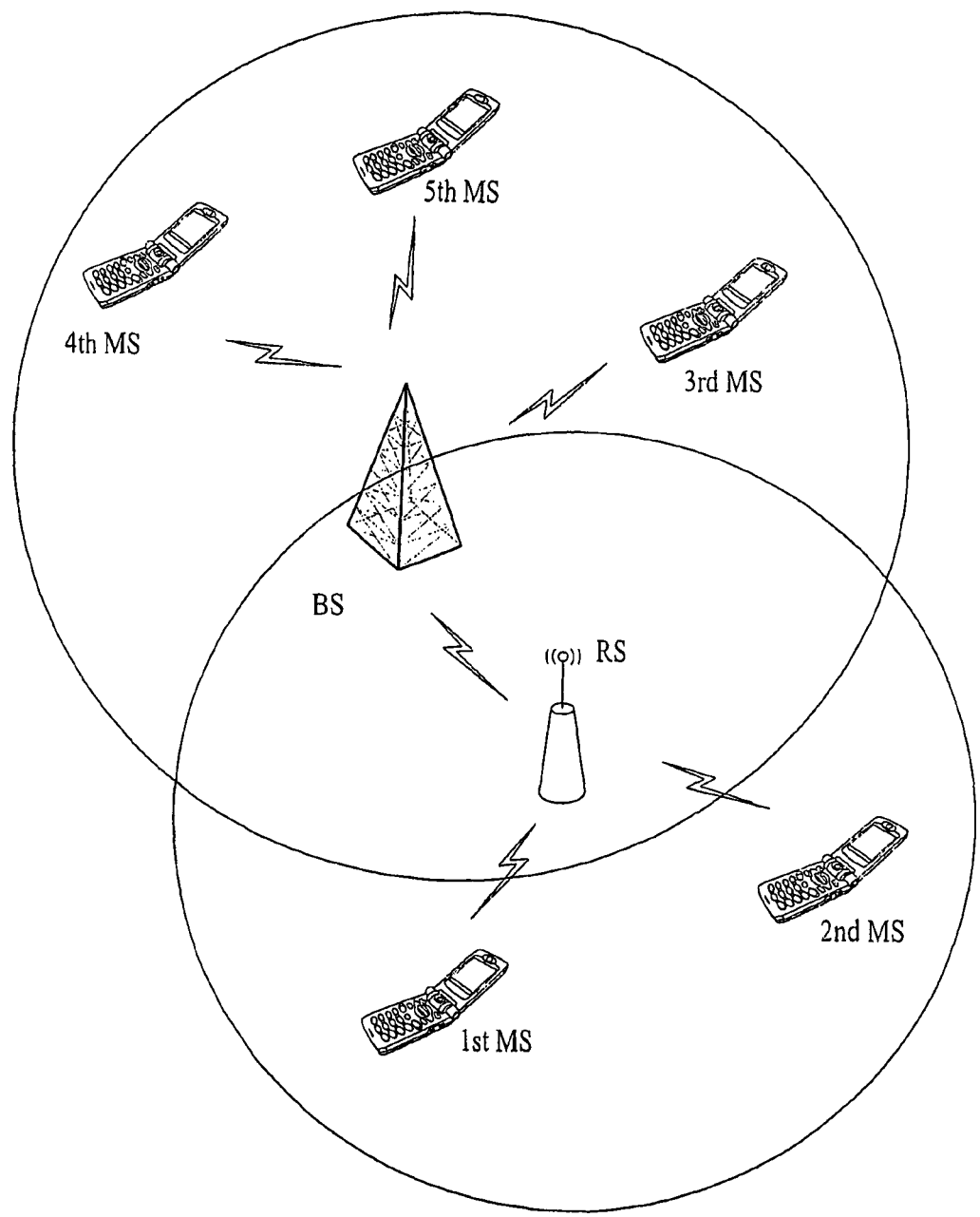
FIG. 10 is an explanatory view illustrating the operation of a relay station (RS)

FIG. 10 is an explanatory view illustrating the operation of the relay station. As shown in FIG. 10, a third mobile subscriber station, a fourth mobile subscriber station, and a fifth mobile subscriber station are within the coverage of the base station, whereby the mobile subscriber stations can communicate with the base station. However, a first mobile subscriber station and a second subscriber station are out of the coverage of the base station. In this case, if the relay station does not relay the signal transmitted from the base station, the first mobile subscriber station and the second subscriber station cannot receive the signal. Accordingly, the relay station relays the signal transmitted from the base station to communicate with mobile subscriber stations which are out of the coverage of the base station but within the coverage of the relay station. As a result, the mobile subscriber stations which are out of the coverage of the base station but within the coverage of the relay station can perform network entry through the relay station. As described above, the relay station can be used for enlargement of the coverage.

Meanwhile, although the third mobile subscriber station, the fourth subscriber station, and the fifth mobile subscriber station can communicate with the base station because they are within the coverage of the base station, the relay station may relay signal transmission for the third, fourth and fifth mobile subscriber stations to enhance throughput.

The mobile relay station can perform subscription to the base station and periodic ranging. The relay station manages a table of connection identifiers (CIDs) of mobile subscriber stations within its coverage, and transmits update information to the base station through periodic ranging if update of the table is required.

In general, when the mobile relay station first enters a cell coverage of the base station, the mobile relay station performs an initiating step similarly to a network entry step of the mobile subscriber station. The relay station which has entered the network needs to identify CIDs of the mobile subscriber stations which perform communication through relay of the relay station. The base station determines whether to perform relay communication with the mobile subscriber stations subscribed to the base station through the relay station or to perform direct communication with the mobile subscriber stations. If relay communication through the relay station is required, the base station transmits to the relay station CIDs of the mobile subscriber stations which should perform relay communication through the relay station.

Table 5 illustrates a CID table indicate message for allowing the base station to transmit CIDs of the mobile subscriber stations which should perform relay communication through the relay station.

TABLE 5

| Syntax | Size | Notes |
| --- | --- | --- |
| RS_MS_Connect( ) { | | |
|   Add_or_delete | 1 bit | '0' add MS_CID |
| | | '1' delete MS_CID |
|   MS_CID | 16 bits | CID of MS to be added to CID table or deleted. |
| } | | |

Figure 11:
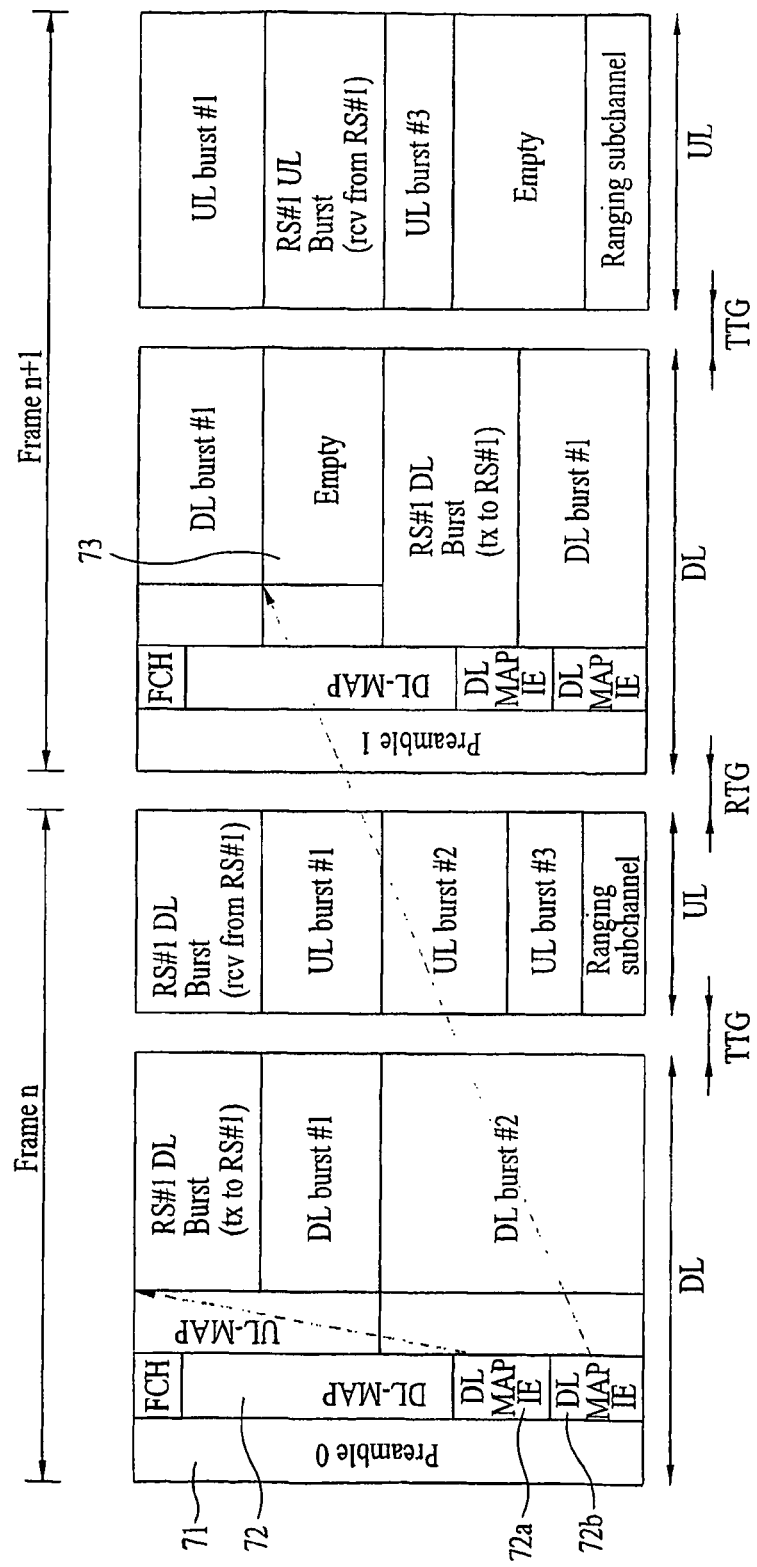
FIG. 11 is an explanatory view illustrating a frame structure of a base station in a mobile communication system provided with a relay station (RS)

FIG. 11 is a diagram illustrating a frame structure of the base station in the mobile communication system including the relay station. As shown in FIG. 11, the base station transmits a preamble 71 for synchronizing with the relay station (RS) during the nth frame, and also transmits a downlink map message 72 including a first information element 72a and a second information element 72a. The first information element has burst allocation information corresponding to the specific relay station during the nth frame. In other words, the first information element has burst allocation information for transmitting data from the base station to the relay station. Meanwhile, the second information element has burst allocation information corresponding to the specific mobile subscriber station during the (n+1)th frame. In other words, the second information element has burst allocation information for transmitting data from the relay station to the mobile subscriber station.

Table 6 is an example illustrating the downlink map information element.

TABLE 6

| Syntax | Size | Notes |
| --- | --- | --- |
| DL-MAP_IE( ) { | | |
| DIUC | 4 bits | |
| if (DIUC == 15) { | | |
| Extended DIUC dependent IE | Variable | See clauses following 8.4.5.3.1 |
| } else { | | |
| if (INC_CID == 1) { | | The DL-MAP starts with INC_CID = 0. INC_CID is toggled between 0 and 1 by the CID-SWITCH_IE( ) (8.4.5.3.7) |
| N_CID | 8 bits | Number of CIDs assigned for this IE |
| for (n = 0; n< N_CID; n++) { | | |
| CID | 16 bits | |
| } | | |
| } | | |

TABLE 6-continued

| Syntax | Size | Notes |
|---|---|---|
| OFDMA Symbol offset | 8 bits | |
| Subchannel offset | 6 bits | |
| Co-operation configuration | 1 bit | Indicate DL-burst in next frame<br>'0' = Present Frame<br>'1' = Next Frame |
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 7 bits | |
| No. Subchannels | 6 bits | |
| Repetition Coding Indication | 2 bits | 0b00 - No repetition coding 0b01 - Repetition coding of 2 used 0b10 - Repetition coding of 4 used 0b11 - Repetition coding of 6 used |
| }<br>} | | |

As shown in Table 6, one field (Co-operation configuration in this embodiment) of the information element is set to '0' or '1' so as to identify whether the information element represents the first information element or the second information element. In other words, it is possible to identify whether to represent a burst allocated during the nth frame or a burst allocated during the (n+1)th frame.

At this time, a burst region 73 allocated to transmit data from the relay station to the mobile subscriber station does not perform signal transmission from the base station to the relay station. In other words, the region allocated by the second information element during the previous frame to transmit data from the relay station to the mobile subscriber station is not allocated for data transmission from the base station to the relay station during the same frame. This is to avoid collision caused as the burst region is repeatedly allocated for data transmission of the base station and data transmission of the relay station.

Figure 12:
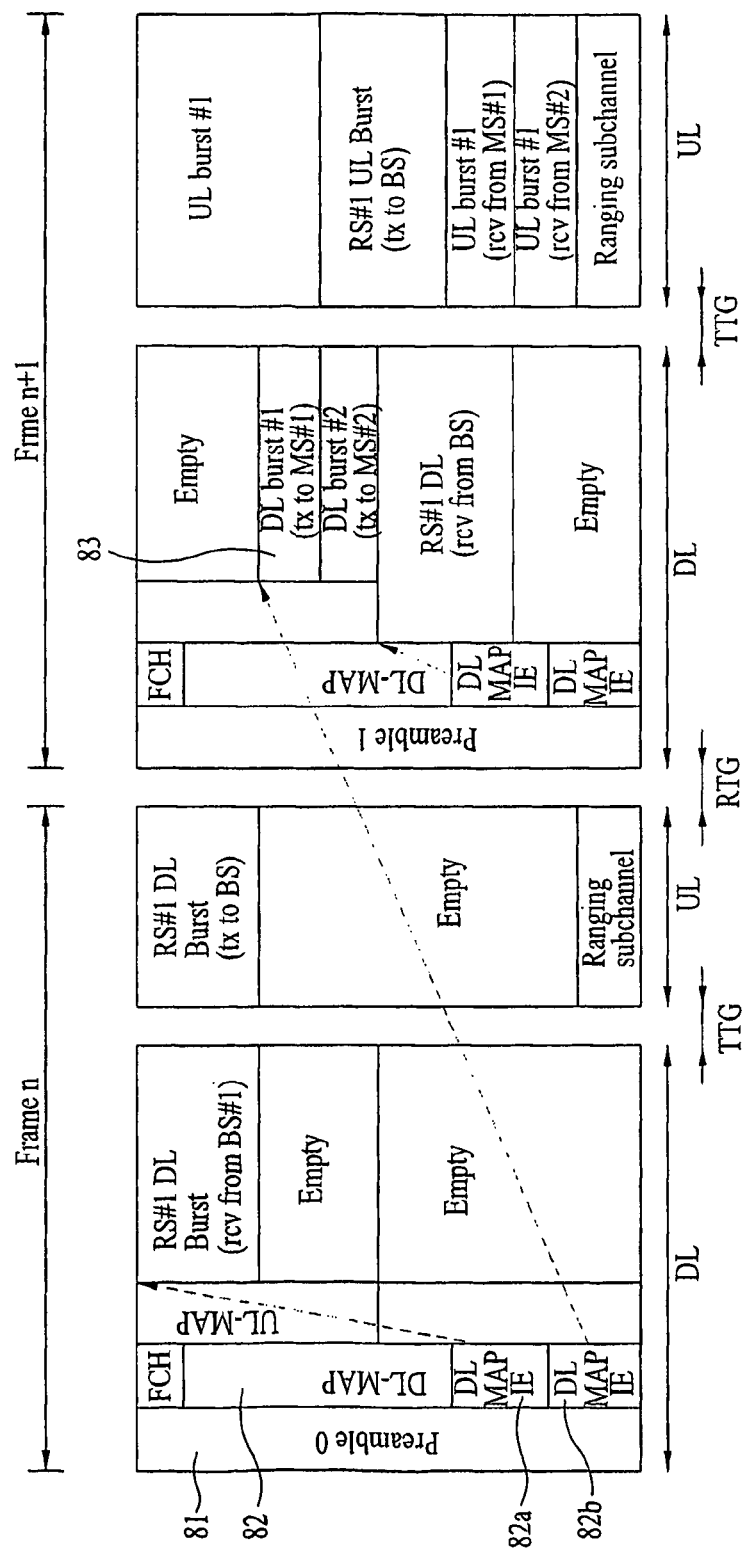
FIG. 12 is an explanatory view illustrating a frame structure of a relay station (RS) in a mobile communication system provided with the relay station (RS)

FIG. 12 is an explanatory view illustrating a frame structure of the relay station (RS) in the mobile communication system provided with the relay station (RS). As shown in FIG. 12, the relay station receives a preamble 81 for synchronizing with the relay station (RS) during the nth frame, and also receives a downlink map message 82 including a first information element 82a and a second information element 82a. The first information element has burst allocation information corresponding to the specific relay station during the nth frame. In other words, the first information element has burst allocation information for transmitting data from the base station to the relay station. Meanwhile, the second information element has burst allocation information corresponding to the specific mobile subscriber station during the (n+1)th frame. In other words, the second information element has burst allocation information for transmitting data from the relay station to the mobile subscriber station.

The relay station identifies burst allocation information for data transmission from the base station to the relay station through the first information element, and receives relay data for the mobile subscriber station through the allocated burst region 83. Data transmission from the base station to the relay station is performed during the nth frame. The relay station receives the data during the nth frame, decodes the received data, and encodes the decoded data.

Meanwhile, the relay station can identify a burst region 84, which is allocated to transmit the data received during the nth frame, decoded and encoded, through the second information element. Accordingly, the relay station transmits the encoded data to the mobile subscriber station by using the burst region 84 allocated through the second information element. As a result, the burst region 83 allocated to transmit data from the relay station to the mobile subscriber station does not transmit any signal from the base station to the relay station, whereby collision can be avoided.

As described above, if scheduling is performed in such a manner that the burst region for data transmission from the base station to the relay station is allocated during the nth frame while the burst region for data transmission from the relay station to the mobile subscriber station is allocated during the (n+1)th frame, the relay station can ensure the time for decoding and encoding the relay data received from the base station. Meanwhile, although one frame has been exemplarily described in the aforementioned embodiment as a delay time for decoding and encoding, data transmission may be performed with delay time more than two frames.

Figure 13A:
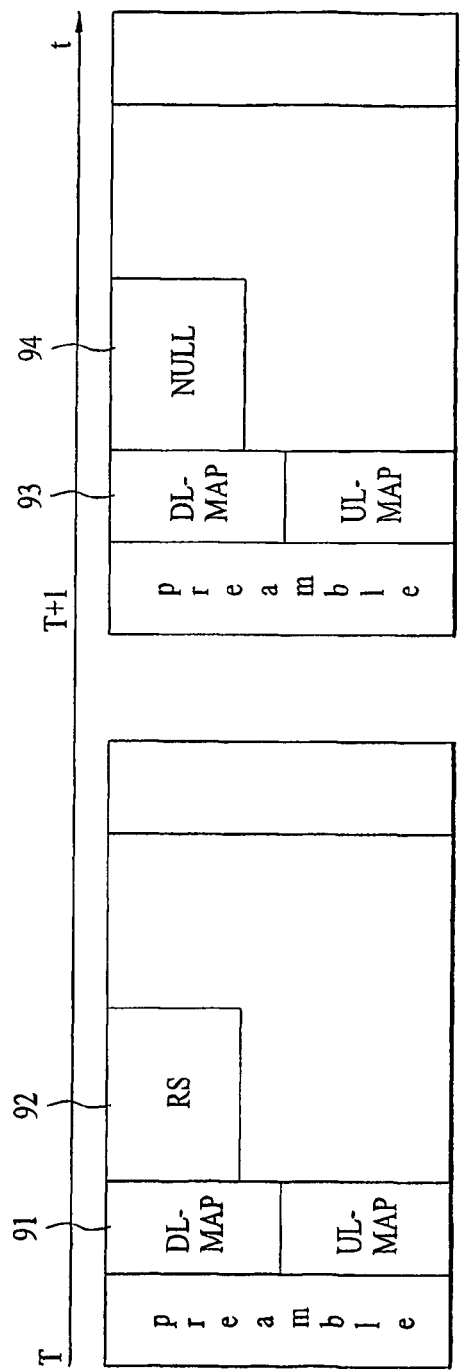
FIGS. 13A to 13C are explanatory views illustrating a first example of a radio resource allocation method in a mobile communication system provided with a relay station (RS)
Figure 13B:
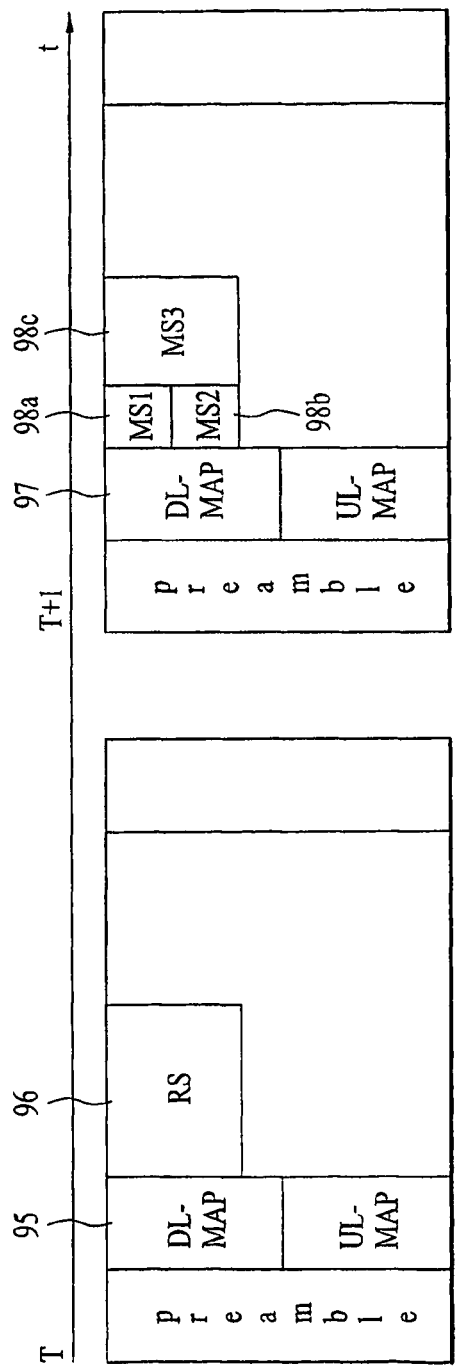
Figure 13C:
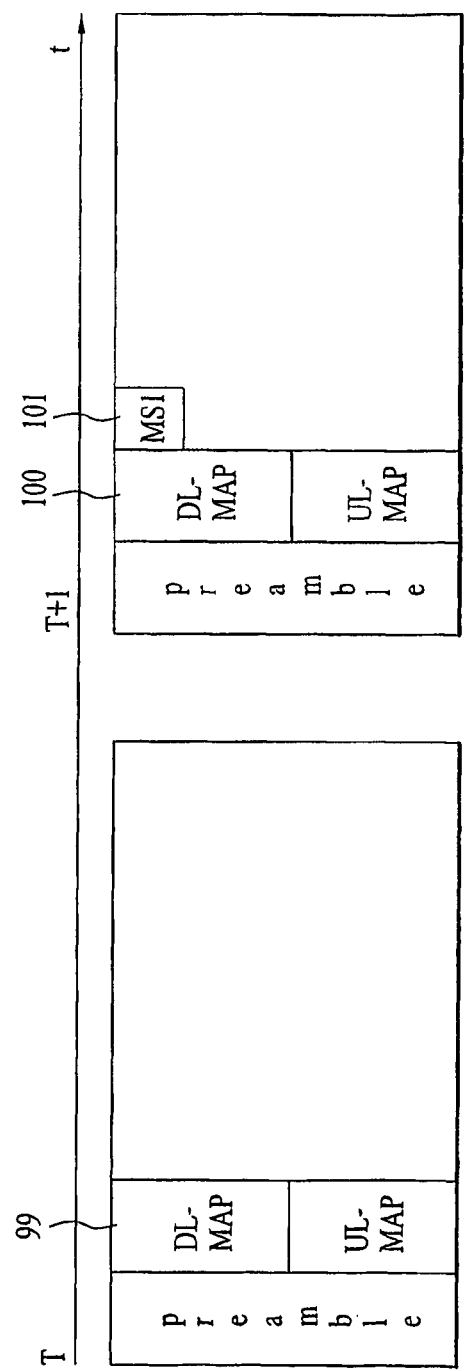

FIGS. 13A to 13C are explanatory views illustrating a first example of a radio resource allocation method in the mobile communication system provided with the relay station (RS). In the first example, a method for allocating the radio resource corresponding to each mobile subscriber station from the base station will be described.

FIG. 13A is a frame schematic view illustrating radio resource allocation information transmission and a radio resource allocation method. FIG. 13A illustrates the operation of the base station in radio resource allocation and radio resource allocation information transmission.

Referring to FIG. 13A, the base station transmits downlink radio resource (region on OFDMA map, hereinafter, referred to as "region") allocation information for transmitting data to the relay station, through a downlink map (DL-MAP) 91 during a T frame. Also, the base station transmits downlink data to the relay station through a region 92 allocated by the downlink map (DL-MAP). Meanwhile, the relay station receives the downlink data transmitted from the base station, and transmits the received data to the mobile subscriber station during a (T+1) frame.

To avoid collision (interference) and data transmission from the relay station to the mobile subscriber station, of the downlink region during the (T+1) frame of the base station, a region 94 for transmitting data from the relay station to the mobile subscriber station is not allocated for any other usage. This region allocation information is transmitted to the relay station and the mobile subscriber station within the region through a downlink map 93 of the (T+1) frame. The control signal transmitted from the base station to the relay station during the T frame may be transmitted to the same frame. The control signal includes a preamble, a downlink map (DL-MAP), DCD, and UCD.

FIG. 13B is a frame schematic view illustrating radio resource allocation information transmission and a radio resource allocation mode. FIG. 13B illustrates the operation of the base station in radio resource allocation and radio resource allocation information transmission.

Referring to FIG. 13B, the relay station receives region allocation information for receiving downlink data transmitted from the base station, through a downlink map (DL-MAP) 95 during the T frame. Also, the relay station receives the downlink data from the base station through a region 96 (corresponding to 92 of FIG. 13A) allocated by the downlink map (DL-MAP) 95. Meanwhile, the relay station receives the downlink data transmitted from the base station, and transmits the received data corresponding to each mobile subscriber station to each mobile subscriber station during the (T+1) frame. As described above, the base station does not allocate regions 98a, 98b and 98c for any usage other than usage for transmitting data corresponding to each mobile subscriber station. Accordingly, the relay station can transmit the downlink data corresponding to each mobile subscriber station through the allocated regions 98a, 98b and 98c (corresponding to 94 of FIG. 13A).

The region information allocated to the mobile subscriber stations is transmitted to the relay station and each mobile subscriber station through a downlink map (DL-MAP) 97 (corresponding to 93 of FIG. 13A). In this case, region (98a, 98b and 98c) allocation to the mobile subscriber station is performed by the base station. Accordingly, the base station can allocate a region for transmitting data from the base station to the relay station and a region for transmitting data from the relay station to the mobile subscriber station every frame.

Table 7 illustrates a downlink map information element including a mobile subscriber station where data transmission is relayed by the relay station and region allocation information of each mobile subscriber station.

TABLE 7

| Syntax | Size | Notes |
|---|---|---|
| DL-MAP-IE( ){ | | |
|   DIUC | 4 bits | |
|   if(DIUC==15){ | | |
|     Extended DIUC dependent IE | Variable | |
|   } else { | | |
|   INC_RS_ID | 1 bit | 0 = RS not included in this IE |
| | | 1 = RS included in this IE |
|   If(INC_RS_ID==1){ | | |
|     N_MS_CID | 8 bits | Number of MS CIDs assigned in RS |
|     For(i=0; i<N_MS_CID;i++){ | | |
|     CID | | |
|     } | | |
|   Else{ | | |
|     N_CID | 8 bits | Number of CIDs assigned for this IE |

Region allocation information of the mobile subscriber station corresponding to each relay station can be transmitted to the relay station through a DL-MAP information element 97 (corresponding to 93 of FIG. 13A) as shown in Table 7.

FIG. 13C is a frame schematic view illustrating radio resource allocation information transmission and a radio resource allocation mode. FIG. 13C illustrates the operation of the mobile subscriber station in radio resource allocation and radio resource allocation information transmission. Referring to FIG. 13C, the first mobile subscriber station exemplarily receives data.

The data transmitted from the base station during the T frame is transmitted to the mobile subscriber station through the relay station during the (T+1) frame. Accordingly, each mobile subscriber station can identify a region allocated to itself by receiving a downlink map 100 (corresponding to 93 of FIG. 13A and 97 of FIG. 13B) transmitted during the (T+1) frame. As a result, as shown in FIG. 13C, the first mobile subscriber station allocated with the downlink region can receive the downlink data through the allocated region 81.

Figure 14A:
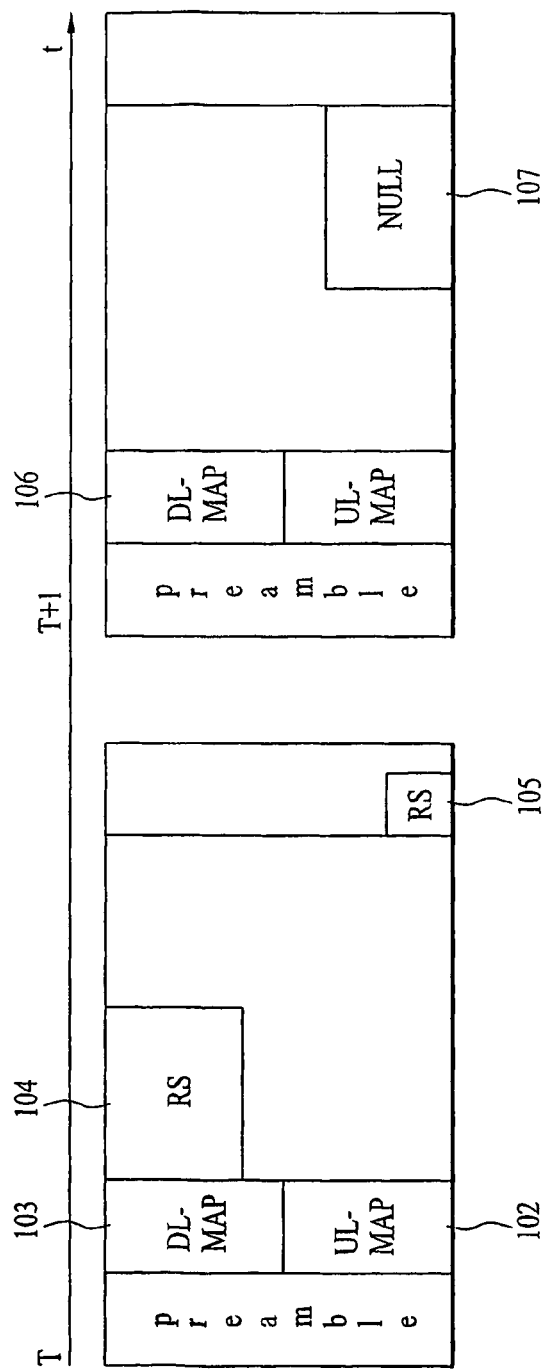
FIGS. 14A to 14C are explanatory views illustrating a second example of a radio resource allocation method in a mobile communication system provided with a relay station (RS)
Figure 14B:
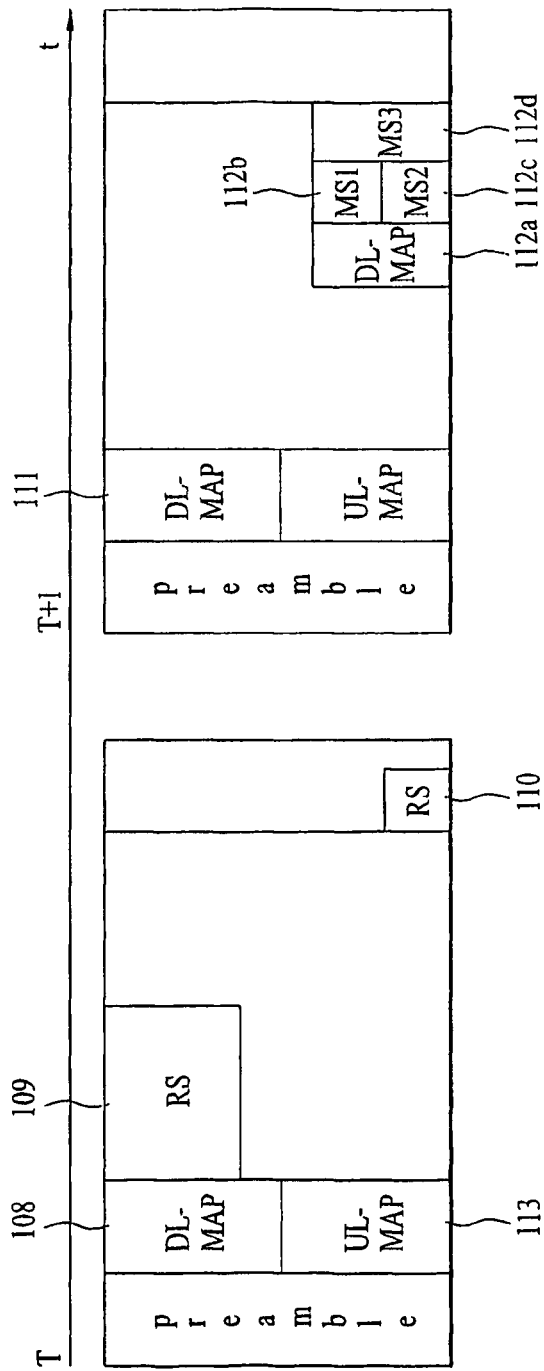
Figure 14C:
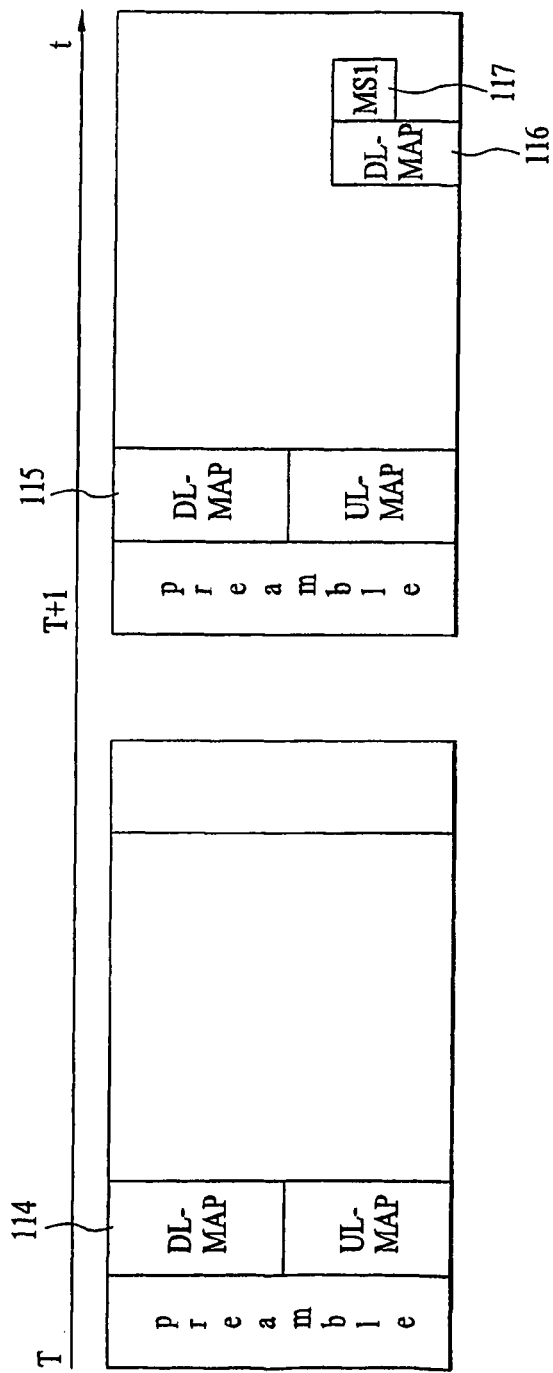

FIGS. 14A to 14C are explanatory views illustrating a second example of a radio resource allocation method in a mobile communication system provided with a relay station (RS). In the second example, data corresponding to each mobile subscriber station are transmitted through sub-frames. A method for allocating a radio resource corresponding to each mobile subscriber station from the relay station in the sub-frames will be described.

FIG. 14A is a frame schematic view illustrating radio resource allocation information transmission and a radio resource allocation method. FIG. 14A illustrates the operation of the base station in radio resource allocation and radio resource allocation information transmission.

Referring to FIG. 14A, the base station transmits downlink radio resource (region on OFDMA map, hereinafter, referred to as "region") allocation information for transmitting data to the relay station through a downlink map (DL-MAP) 103 during a T frame. Also, the base station transmits downlink data to the relay station through a region 104 allocated by the downlink map (DL-MAP) 103. Meanwhile, the relay station receives the downlink data transmitted from the base station, and transmits the received data to the mobile subscriber station during a (T+1) frame.

To avoid collision (interference) and data transmission from the relay station to the mobile subscriber station, of the downlink region of the (T+1) frame of the base station, a region 107 for transmitting data from the relay station to the mobile subscriber station is not allocated for any other usage. This region allocation information of the (T+1) frame is transmitted to the relay station and the mobile subscriber station within the region through a downlink map 106 of the (T+1) frame.

FIG. 14B is a frame schematic view illustrating radio resource allocation information transmission and a radio resource allocation mode. FIG. 14B illustrates the operation of the relay station in radio resource allocation and radio resource allocation information transmission.

Referring to FIG. 14B, the relay station receives region allocation information for transmitting data to the relay station, through a downlink map (DL-MAP) 108 during the T frame. Also, the relay station receives downlink data from the base station through a region 109 allocated by the downlink map (DL-MAP) 108. Meanwhile, the relay station receives the downlink data transmitted from the base station, and transmits the received data corresponding to each mobile subscriber station during the (T+1) frame.

At this time, in order to transmit the received downlink data to each mobile subscriber station, the relay station can allocate regions 112b, 112c and 112d corresponding to each mobile subscriber station. In other words, the relay station can determine how to allocate regions 112a to 112d (corresponding to 107 of FIG. 14A) allocated from the base station to each mobile subscriber station during the (T+1) frame. In order to notify each mobile subscriber station of region information to be allocated to each mobile subscriber station, one 112a of the regions allocated from the base station can be used as a downlink map (DL-MAP) from the relay station to the mobile subscriber station. In other words, the relay station constitutes the region allocated from the base station as a single sub-frame to perform region allocation and region allocation information transmission to each mobile subscriber station.

Meanwhile, the relay station can notify the base station of region allocation information to the mobile subscriber station. In other words, as shown in FIG. 14A and FIG. 14B, the relay station can in advance notify the base station of downlink region allocation information to be used for sub-frames 112a to 112d belonging to the next frame ((T+1) frame), through an uplink region (corresponding to 105 of FIG. 14A and 110 of FIG. 14B) allocated to the relay station during the T frame. At this time, the relay station may notify the base station of the downlink allocation information by using a feedback header.

Figure 15:
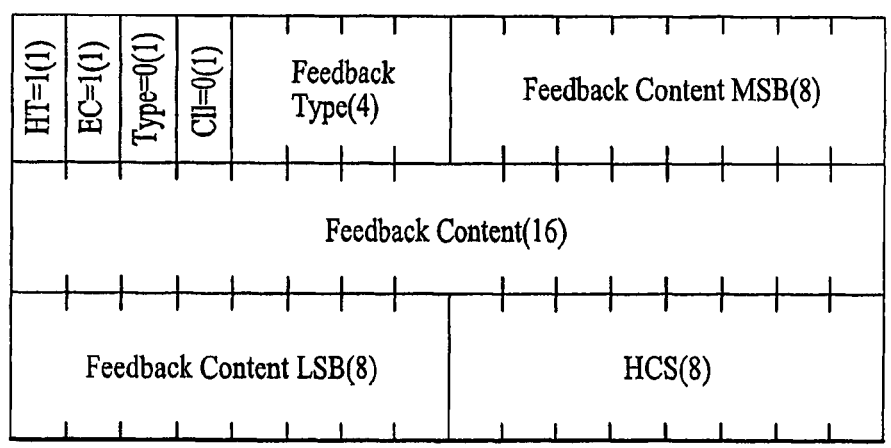
FIG. 15 is a schematic view illustrating a feedback header.

FIG. 15 is a schematic view illustrating the feedback header. Table 8 illustrates feedback information for downlink allocation information report according to a feedback header format of FIG. 15.

TABLE 8

| Feedback type | Feedback contents | Description |
| --- | --- | --- |
| 1110 | OFDMA symbol offset (8 bits) + Subchannel offset (8 bits) + No.OFDMA symbol (8 bits) + No.subchannels (8 bits) | Region to be used by RS |

Meanwhile, the uplink region (corresponding to 105 of FIG. 14A and 110 of FIG. 14B) allocated to the relay station for downlink allocation information report to the mobile subscriber station during the T frame is transmitted through a downlink map (DL-MAP) (corresponding to 102 of FIG. 14A and 113 of FIG. 14B). At this time, the uplink region allocation information may be transmitted through an information element (RS_Feedback_allocation_IE) included in the downlink map (DL-MAP).

Table 9 illustrates an example of an information element (RS_Feedback_allocation_IE) having uplink region information allocated to the relay station for downlink allocation information report to the mobile subscriber station.

TABLE 9

| Syntax | Size | Index |
| --- | --- | --- |
| RS_Feedback_allocation_IE { | | |
| RS_ID | Variable | |
| UIUC | 4 bits | |
| OFDMA symbol offset | 7 bits | |
| subchannel offset | 7 bits | |
| No.OFDMA symbols | 7 bits | |
| No.Subchannel | 7 bits | |
| } | | |

The relay station reports the downlink allocation information of the mobile subscriber station to the base station through the uplink region (corresponding to 105 of FIG. 14A and 110 of FIG. 14B) allocated to the relay station as described above. At this time, the downlink allocation information can be transmitted through the feedback header.

As shown in FIG. 14B, the relay station reports the downlink allocation information of the mobile subscriber station to the base station by using the feedback header during the T frame, and transmits data to each mobile subscriber station through the sub-frame of the (T+1) frame. In other words, the relay station transmits the downlink region information allocated to each mobile subscriber station through the downlink map (DL-MAP) 112a. At this time, the downlink region is allocated considering the channel status of each mobile subscriber station. Meanwhile, the data can be transmitted by using DIUC more suitable for each mobile subscriber station.

Table 10 illustrates an example of the downlink map (DL-MAP) of the sub-frame.

TABLE 10

| Syntax | Size | Index |
| --- | --- | --- |
| SUB_RS_MAP{ | | |
| N_CID | Variable | |
| For(j=1; j<N_CID; i++){ | | |
| CID | | |
| DIUC | 4 bit | |
| OFDMA symbol offset | 7 bit | |
| Subchannel offset | 7 bit | |
| No.OFDMA symbols | 7 bit | |
| No.Subchannel | 7 bit | |
| } | | |
| } | | |

FIG. 14C is a frame schematic view illustrating radio resource allocation information transmission and a radio resource allocation mode. FIG. 14C illustrates the operation of the mobile subscriber station in radio resource allocation and radio resource allocation information transmission. FIG. 14C illustrates an example of the first mobile subscriber station receiving data.

The data transmitted from the base station during the T frame is transmitted to the mobile subscriber station through the relay station during the (T+1) frame. Accordingly, each mobile subscriber station can identify a downlink region allocated to itself by receiving a downlink map 116 (corresponding to 112a of FIG. 14B) of the sub-frame transmitted from the relay station during the (T+1) frame. As a result, as shown in FIG. 14C, the first mobile subscriber station allocated with the downlink region can receive the downlink data through the allocated region 117.

Figure 16:
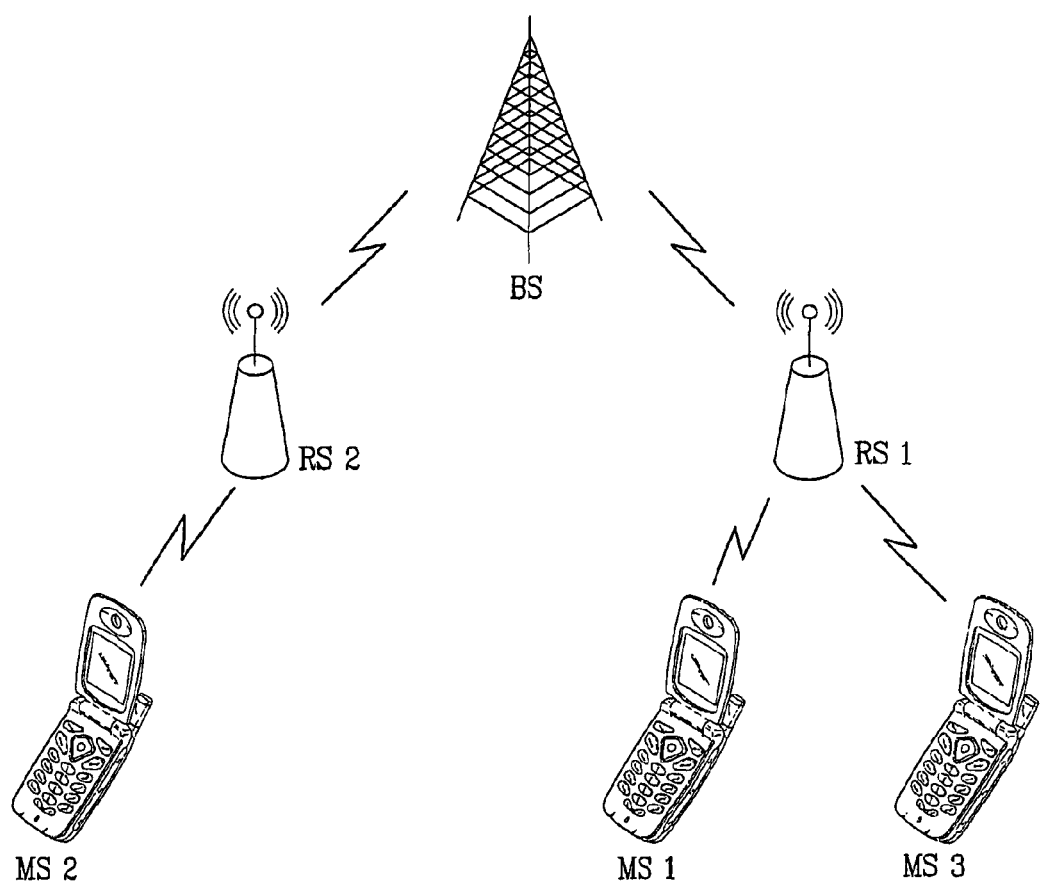
FIG. 16 is a schematic view illustrating a relay network.

FIG. 16 is a schematic view illustrating a relay network according to the preferred embodiments of the present invention. Referring to FIG. 16, the base station BS communicates with two mobile subscriber stations MS 1 and MS 3 through a relay station RS 1 and communicates with the other mobile subscriber station MS 2 through a relay station RS 2. Although FIG. 16 illustrates the mobile subscriber stations which are out of a cell area managed by the base station, technical features of the present invention may be applied to mobile subscriber stations which are within the cell area of the base station and perform communication through the relay station.

FIGS. 17A to 17D are schematic views illustrating frames transmitted and received sequentially between the base station or the relay station and the mobile subscriber stations in accordance with the preferred embodiment of the present invention.

Figure 17A:
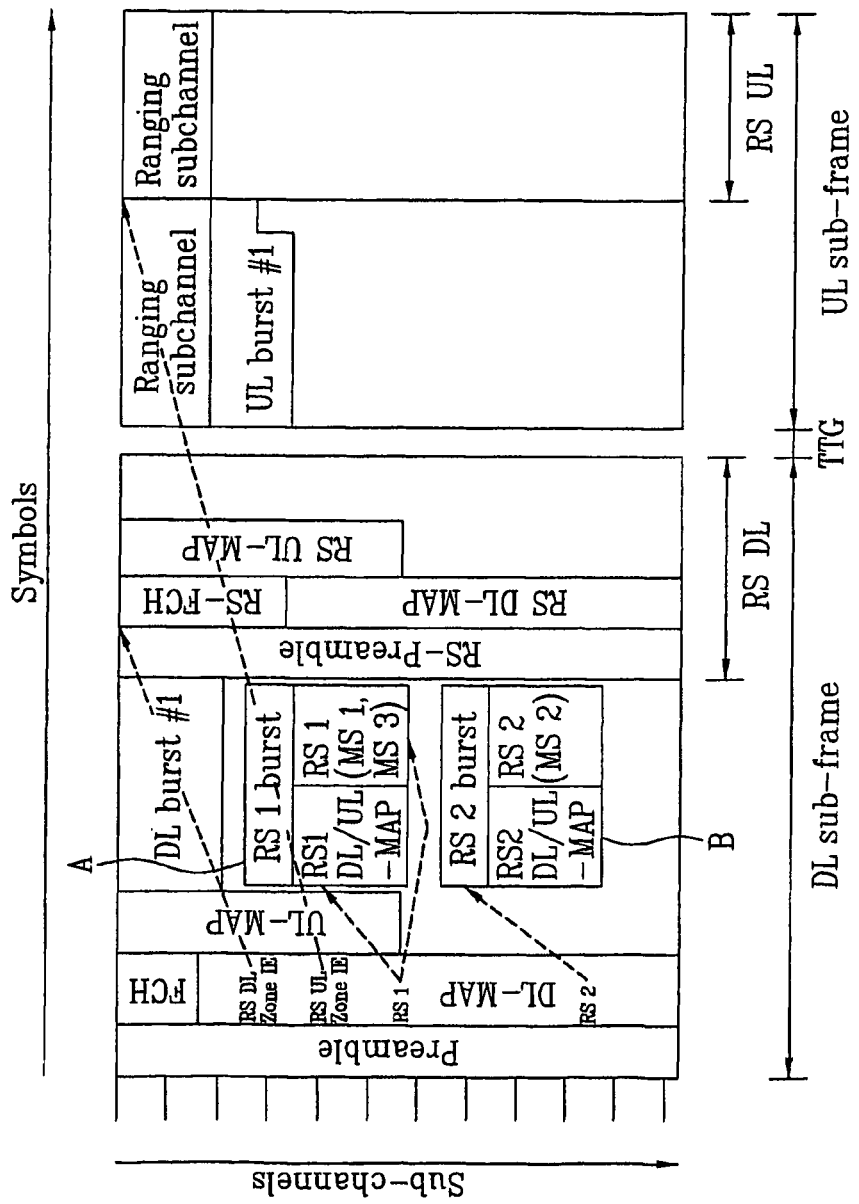
FIGS. 17A to 17D are schematic views illustrating frames transmitted and received sequentially between a base station or a relay station and a mobile subscriber station.

FIG. 17A illustrates a structure of an nth frame transmitted and received between the base station BS and the relay stations RS 1 and RS 2. It is apparent that the base station, the relay stations, or other mobile subscriber stations communicating with the base station without through the relay station can transmit and receive data through the nth frame. In the OFDM or OFDMA communication system, the frame can be defined by a two-dimensional plane of a horizontal axis of a symbol (or time) and a vertical axis of a subchannel (or frequency). The whole frame is comprised of a downlink sub-frame (DL sub-frame) and an uplink sub-frame (UL sub-frame).

If communication is performed between the base station and the mobile subscriber station through the relay station, the frame should be assigned with a region for performing communication between the relay station and the mobile subscriber station. The region is defined as 'relay station region (or RS region)' herein. In FIG. 17A, a portion marked by 'RS DL' is a relay station downlink region, and a portion marked by 'RS UL' is a relay station uplink region. The data transmitted from the base station to the relay station is allocated to the downlink of the frame in a burst mode while the data transmitted from the relay station to the mobile subscriber station is allocated to the relay station downlink region. In the case that the mobile subscriber station has data to be transmitted to the base station, the data are transmitted through the region allocated to the mobile subscriber station from the uplink region indicated by the uplink map (UL-MAP) of the relay station, and the relay station transmits the data received from the mobile subscriber station to the base station through the relay station uplink region (RS UL).

The relay station downlink region includes a length of the relay station downlink and uplink map (RS DL/UL MAP), RS-FCH (frame controller header) including coding information, an RS-preamble region for synchronizing with the mobile subscriber station, relay station downlink and uplink map regions, and relay station downlink and uplink data burst regions. The RS-preamble may have different sequences per relay station. The map structure of the relay station region and burst allocation within the relay station region are determined by the base station.

The base station includes identification information for identifying the relay station downlink region and the relay station uplink region within the frame, in the downlink map (DL-MAP), and transmits the information to the relay station and the mobile subscriber station, wherein the identification information may be included in the relay station downlink region information element (RS DL Zone IE) and the relay station uplink region information element (RS UL Zone IE).

The base station transmits the relay station downlink map (DL-MAP) information and the relay station uplink map (UL-MAP) information to each relay station. The relay station downlink map information and the relay station uplink map information include downlink and uplink map information for each mobile subscriber station in the relay station downlink and uplink regions. Also, the relay station downlink and uplink map information may include a frame number (for example, (n+1)th frame) which is to transmit data of the mobile subscriber station received from the base station, position information (for example, symbol and subchannel offset value based on the RS-preamble) of RS DL/UL MAP of each relay station, RS DL/UL MAP length, and FCH information including coding information. The downlink and uplink map information for each mobile subscriber station includes downlink data burst allocation information and uplink data burst allocation information, wherein the downlink data burst allows each relay station to transmit data to each mobile subscriber station and the uplink data burst allows each mobile subscriber station to transmit data to each relay station.

The base station may include the relay station downlink and uplink map information in the downlink map (DL-MAP) region and the uplink map (UL-MAP) region along with the downlink and uplink map information allocated to the mobile subscriber station which directly communicates with the base station without through the relay station. Each relay station includes the relay station uplink/downlink map information included in the downlink map region and the uplink map region in the relay station downlink map region (RS DL-MAP Zone) and the relay station uplink map region (RS DL-MAP Zone) of the relay station downlink region or the relay station uplink region, and then transmits the map information to the mobile subscriber station. Each mobile subscriber station is allocated with the downlink data burst for receiving data from the relay station and the uplink data burst for transmitting data to the relay station in accordance with the relay station downlink/uplink map information included in the relay station downlink map region (RS DL-MAP Zone) and the relay station uplink map region (RS UL-MAP Zone). In this case, since each relay station should include downlink map information and uplink map information of other relay stations in the relay station downlink map region (RS DL-MAP Zone) and the relay station uplink map region (RS UL-MAP Zone), a problem occurs in that the radio resource is consumed.

To solve the above problem, the base station can include the relay station downlink and uplink map information in the data burst allocated to each relay station and then can transmit the map information to each relay station. In other words, if there exist data to be transmitted to the mobile subscriber stations MS 1, MS 2, and MS 3 through the relay stations RS 1 and RS 2, the base station allocates the data burst of each relay station to the downlink data burst region and transmits the data through the allocated data burst. In FIG. 17A, a region 'A' represents a data burst including data to be transmitted from the base station to the mobile subscriber stations MS 1 and MS 3 through the relay station RS 1 and is allocated to the relay station RS 1, and a region 'B' represents a data burst including data to be transmitted from the base station to the mobile subscriber station MS 2 through the relay station RS 2 and is allocated to the relay station RS 2. At this time, the data bursts A and B respectively allocated to the relay stations RS 1 and RS 2 include the relay station downlink and uplink map (RS1 DL/UL-MAP and RS2 DL/UL-MAP) information along with the data to be transmitted to the mobile subscriber stations. The base station designates the positions of the data bursts A and B allocated to the relay stations RS 1 and RS 2 and a frame number for transmitting data to the mobile subscriber station in the relay stations RS 1 and RS 2 through the DL-MAP information element (IE) of the downlink map (DL-MAP) region.

The relay stations RS 1 and RS 2 identify the positions of the data bursts A and B allocated thereto through the DL-MAP information element, and transmit the relay station downlink region to the mobile subscriber station by using the relay station downlink and uplink map (RS1 DL/UL-MAP and RS2 DL/UL-MAP) information included in their corresponding data bursts.

Figure 17B:
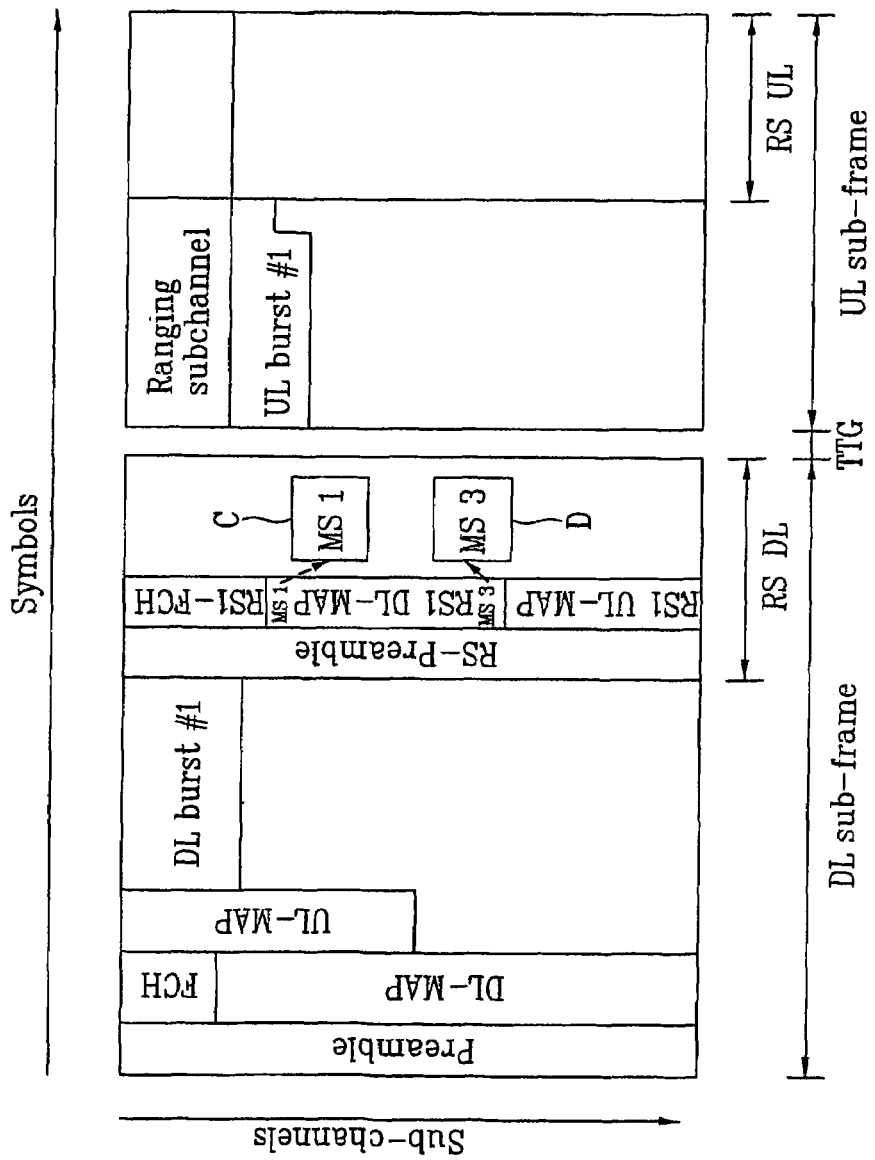

FIG. 17B illustrates a structure of a frame ((n+1)th frame) designated by the base station to allow the relay station RS 1 to transmit the data to the mobile subscriber stations MS 1 and MS 3, i.e., a structure of the (n+1)th frame transmitted from the relay station RS 1 to the mobile subscriber stations MS 1 and MS 3. Referring to FIG. 17B, the relay station RS 1 includes the relay station downlink and uplink map (RS1 DL/UL-MAP) information in the RS1 UL-MAP region and RS1 DL-MAP region of the relay station downlink region, wherein the relay station downlink and uplink map (RS1 DL/UL-MAP) information is included in the data burst A allocated from the base station to the relay station RS 1. The relay station RS 1 includes data to be transmitted to respective mobile subscriber stations MS 1 and MS 3 in data bursts C and D for the respective mobile subscriber stations MS 1 and MS 3 indicated by the relay station downlink and uplink map information and then transmits the data. Since the relay station downlink and uplink map (RS1 DL/UL-MAP) information for each relay station is transmitted through the data bursts for each relay station, relay station downlink and uplink map (RS1 DL/UL-MAP) information for other relay station is not included repeatedly in UL-MAP or DL-MAP region of the relay station. The mobile subscriber stations MS 1 and MS 3 synchronize with the relay station RS 1 through the RS-preamble of the (n+1)th frame of FIG. 17B, identify the positions of the data bursts C and D allocated from the relay station downlink map (RS1 DL-MAP) information included in the RS1 UL-MAP region of the relay station downlink region, and receive the data.

Figure 17C:
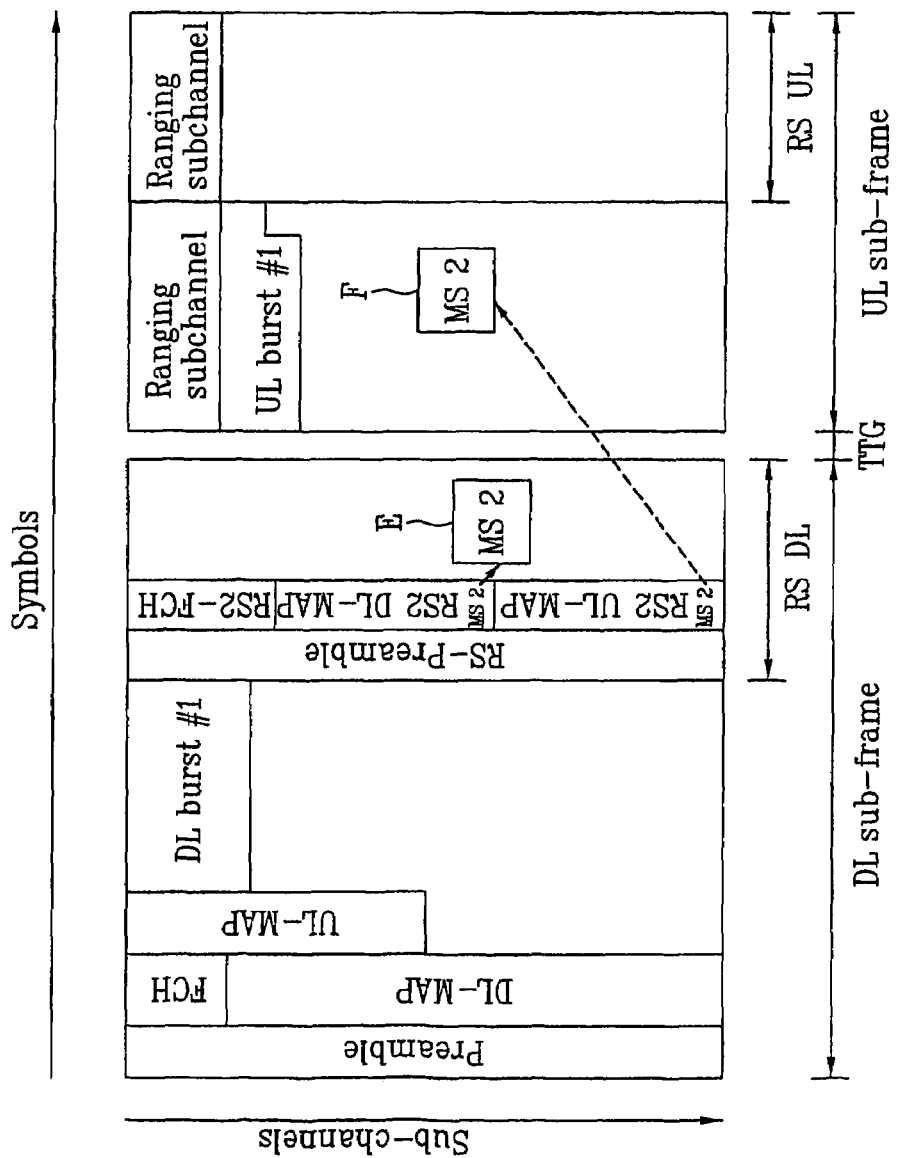

FIG. 17C illustrates a structure of the frame ((n+1)th frame) designated by the base station to allow the relay station RS 2 to transmit data to the mobile subscriber station MS 2. The relay station RS 2 includes relay station downlink and uplink map (RS2 DL/UL-MAP) information included in the data burst B allocated from the base station in RS2 UL-MAP region and RS2 DL-MAP region of the relay station downlink region, and includes the data to be transmitted to the mobile subscriber station MS 2 in a data burst B for the mobile subscriber station MS 2 indicated by the relay station downlink and uplink map information. The mobile subscriber station MS 2 synchronizes with the relay station RS 2 through the RS-preamble of the (n+1)th frame of FIG. 17C, identifies the position of the data burst E allocated from the relay station downlink map (RS2 DL-MAP) information included in the RS2 UL-MAP region of the relay station downlink region, and receives the data. In FIG. 17C, a region 'F' represents an uplink data burst allocated to the mobile subscriber station MS 2.

Figure 17D:
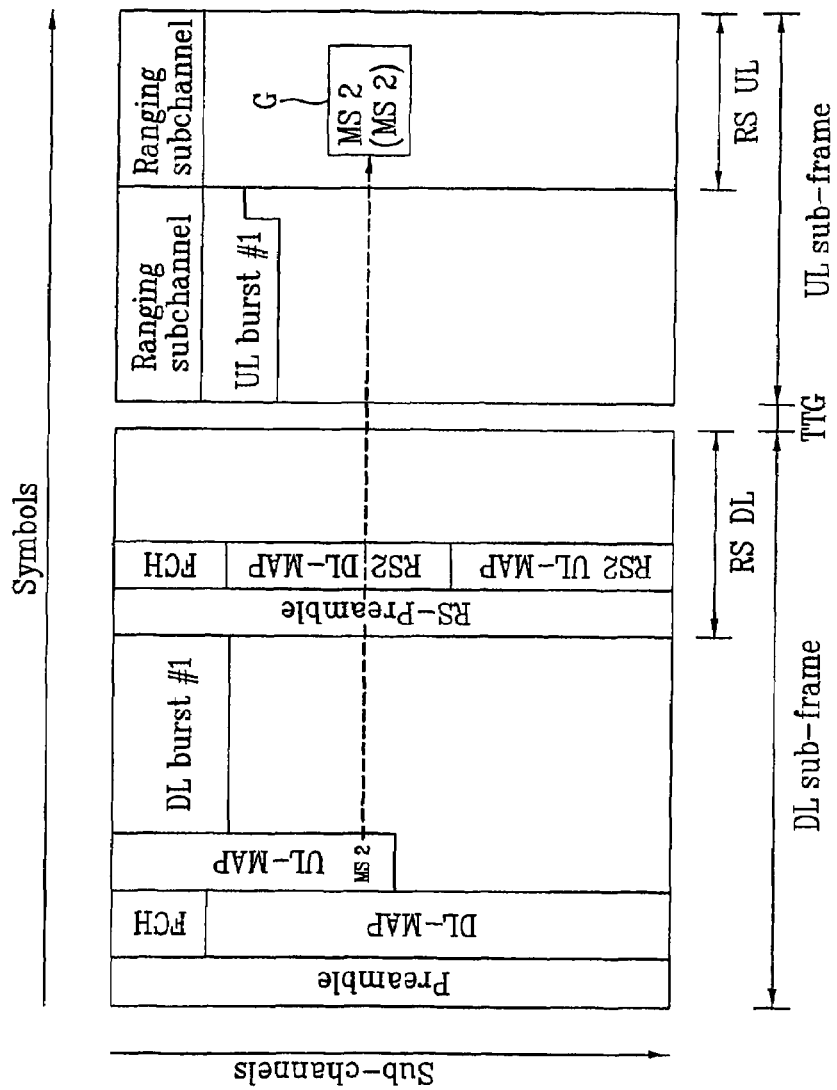

FIG. 17D illustrates a structure of a frame ((n+2)th frame) designated by the base station to allow the mobile subscriber station MS 2 to transmit data to the relay station RS 2. The relay station RS 2 transmits the data received from the mobile subscriber station MS 2 to the base station through an uplink data burst G for the relay station RS 2 indicated by the uplink map (UL-MAP) information.

Figure 18A:
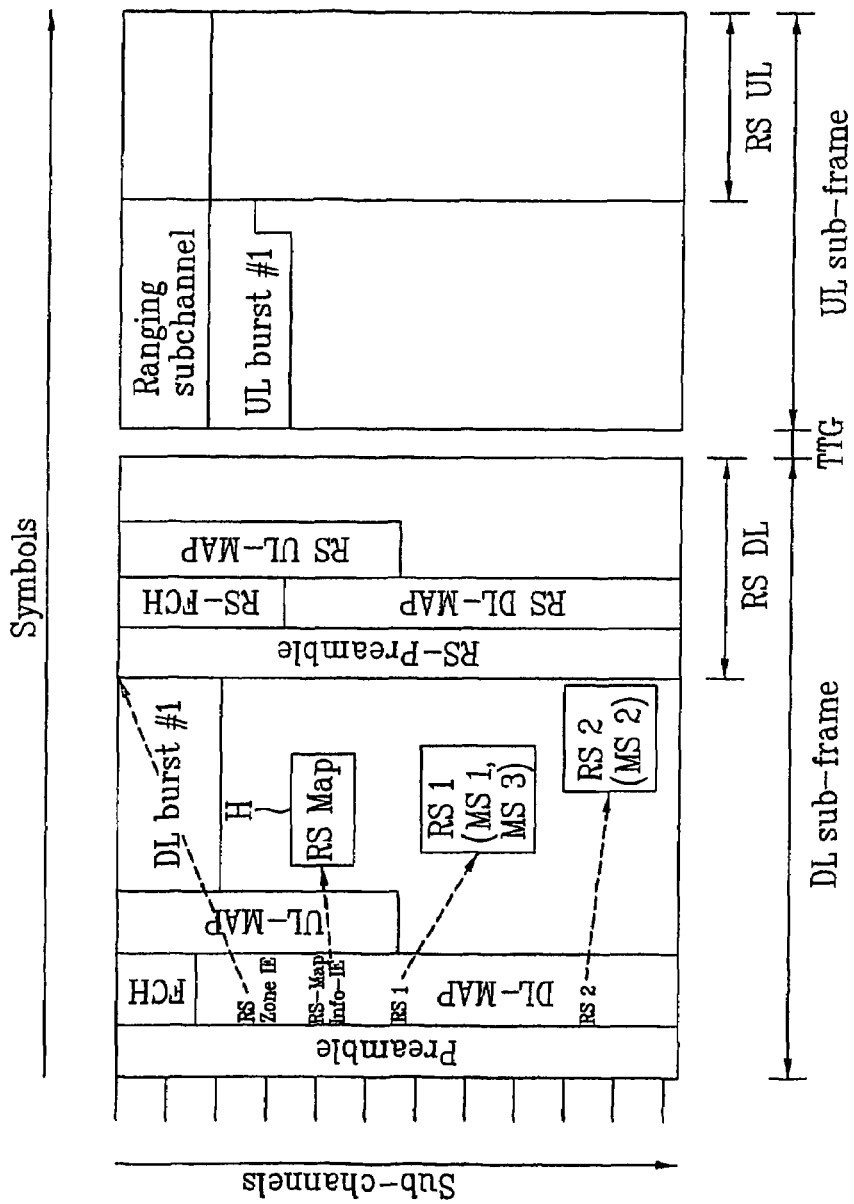
FIGS. 18A and 18B are schematic views illustrating a frame structure.
Figure 18B:
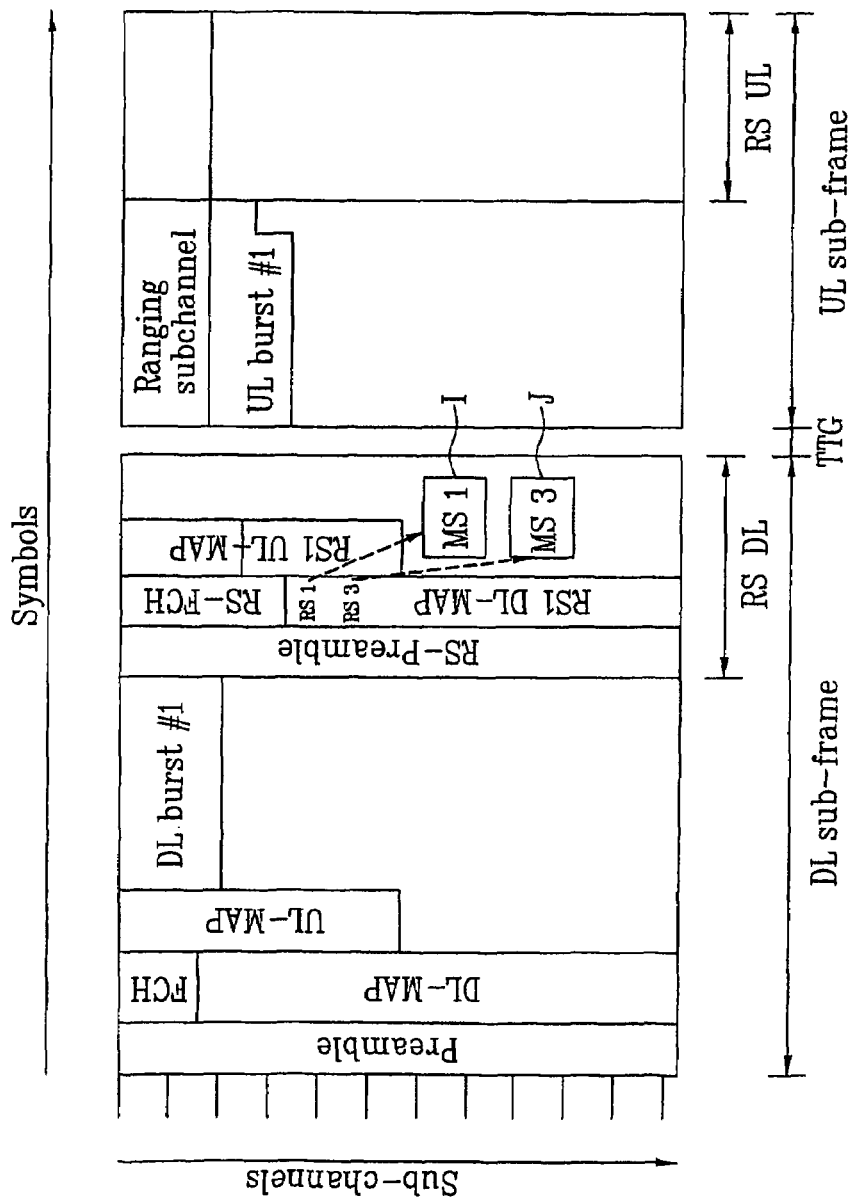

FIGS. 18A and 18B are schematic views illustrating a frame structure according to the preferred embodiments of the present invention. FIGS. 18A and 18B respectively illustrate the nth frame transmitted and received between the base station BS and the relay stations RS 1 and RS 2, and the (n+1)th frame transmitted from the relay station RS 1 to the mobile subscriber stations MS 1 and MS 3.

In the embodiment shown in FIG. 18A, the base station transmits the relay station downlink and uplink map information included in the data bursts to the relay station in the same manner as the embodiment shown in FIG. 17A. However, in the embodiment of FIG. 17A, the base station transmits the relay station downlink and uplink map information included in the data burst to which the data transmitted to each relay station is allocated, whereas in the embodiment of FIG. 18A, the base station transmits the relay station downlink and uplink map information through a data burst different from the data burst to which the data transmitted to each relay station is allocated.

In the embodiment of FIG. 18A, the relay station downlink and uplink map information for each relay station may be transmitted through a separate data burst. Alternatively, the relay station downlink and uplink map information for two or more relay stations may be transmitted through a single data burst. Also, the relay station downlink and uplink map information for all the relay stations may be transmitted through a single data burst. In each case, the base station should notify each relay station of the position of the burst to which the relay station downlink and uplink map information is allocated, wherein the relay station downlink and uplink map information is allocated to each relay station through the relay station map information (RS-MAP info) IE included in the downlink map (DL-MAP) region. In the case that the relay station downlink and uplink map information for all the relay stations is transmitted through a single data burst, a data burst based on a broadcast CID is preferably used. In FIG. 18A, a region H represents a data burst including the relay station downlink and uplink map information for all the relay stations.

The operation performed after each of the relay stations RS 1 and RS 2 receives the frame shown in FIG. 18A is almost similar to that described with reference to FIGS. 17A to 17D. However, since the data burst including the relay station downlink and uplink map information is different from the data burst including data to be transmitted to the mobile subscriber station, each relay station should recognize the position of data burst including the relay station downlink and uplink map information allocated from the DL-MAP region included in the nth frame and the position of the data burst including the data to be transmitted to the mobile subscriber station so as to receive the relay station downlink and uplink map information and the data to be transmitted to the mobile subscriber station.

Referring to FIG. 18B, the relay station RS 1 transmits the relay station downlink and uplink map (RS1 DL/UL-MAP) information and the data to be transmitted to each mobile subscriber station by including the relay station downlink and uplink map (RS 1 DL/UL-MAP) information in the RS 1 UL-MAP region and the RS 1 DL-MAP region of the relay station downlink region, wherein the relay station downlink and uplink map (RS1 DL/UL-MAP) information is included in the data burst H including the relay station downlink and uplink map information, and also including the data to be transmitted to each mobile subscriber station in data bursts I and J for the respective mobile subscriber stations MS 1 and MS 3 indicated by the relay station downlink and uplink map information. The mobile subscriber stations MS 1 and MS 3 synchronize with the relay station RS 1 through the RS-preamble of the (n+1)th frame of FIG. 18B, and receives data by recognizing the positions of the data bursts I and J allocated from the relay station downlink map (RS 1 DL-MAP) information included in the RS1 UL-MAP region of the relay station downlink region.

Table 11 illustrates an example of a data format of the downlink map information element (DL-MAP IE) for allowing the base station to indicate the relay station on the position of the burst including the relay station downlink and uplink map information.

TABLE 11

| Syntax | Size | Notes |
| --- | --- | --- |
| DL-MAP_IE( ) { | | |
| DIUC | 4 bits | |
| if (DIUC == 15) { | | |
| Extended DIUC dependent IE | variable | See clauses following 8.4.5.3.1 |
| } else { | | |

TABLE 11-continued

| Syntax | Size | Notes |
|---|---|---|
| if (INC_CID == 1) { | | The DL-MAP starts with INC_CID = 0. INC_CID is toggled between 0 and 1 by the CID-SWITCH_IE( ) (8.4.5.3.7) |
| N_CID | 8 bits | Number of CIDs assigned for this IE |
| for (n=0; n< N_CID; n++) { | | |
| CID | 16 bits | |
| } | | |
| } | | |
| OFDMA Symbol offset | 8 bits | |
| Subchannel offset | 8 bits | |
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 5 bits | |
| No. Subchannels | 6 bits | |
| Repetition Coding Indication | 2 bits | 0b00 - No repetition coding 0b01 - Repetition coding of 2 used 0b10 - Repetition coding of 4 used 0b11 - Repetition coding of 6 used |
| } | | |
| } | | |

Table 12 and Table 13 define a new DIUC type (extended DIUC) for an information element indicating the position of the burst including the relay station downlink and uplink map information.

TABLE 12

| DIUC | Usage |
|---|---|
| 0-12 | Different burst profiles |
| 13 | Gap/PAPR reduction |
| 14 | End of map Extended-2 DIUC IE |
| 15 | Extended DIUC |

TABLE 13

| Extended DIUC (hexadecimal) | Usage |
|---|---|
| 00 | Channel_Measurement_IE |
| 01 | STC_Zone_IE |
| 02 | AAS_DL_IE |
| 03 | Data_location_in_another_BS_IE |
| 04 | CID_Switch_IE |
| 05 | MIMO_DL_Basic_IE |
| 06 | MIMO_DL_Enhanced_IE |
| 07 | HARQ_Map_Pointer_IE |
| 08 | PHYMOD_DL_IE |
| 09-0A | reserved |
| 0B | DL PUSC Burst Allocation in Other Segment |
| 0C | RS_Map_Info_IE |
| 0D-0E | reserved |
| 0F | UL_interference_and_noise_level_IE |

Table 14 illustrates an example of a data format of the relay station downlink map information element (RS MAP_Info IE) for allowing the base station to indicate the relay station on the position of the burst including the relay station downlink and uplink map information. In the case that DIUC is '15' and 'Extended DIUC dependent IE' field is '0C,' the relay station reads out the RS MAP_Info IE of Table 14 referring to DL-MAP IE of Table 3 to identify the position of the burst including the relay station downlink and uplink map information. Although the position of the burst is designated by subchannel offset, symbol offset, the number of subchannels, and the number of symbols in Table 14, it is not limited to such examples of Table 14.

| Syntax | Size (bits) | Notes |
|---|---|---|
| RS_Map_Info_IE( ) { | | |
| Extended DIUC | 4 | RS = 0x0C |
| Length | 4 | |
| OFDMA symbol offset | 8 | |
| Subchannel offset | 6 | |
| No.OFDMA Symbols | 8 | |
| No.subchannels | 6 | |
| Reserved | 1 | Shall be set to zero. |
| } | | |

Hereinafter, examples of a method for designating and retrieving a relay station region according to the present invention will be described with reference to the accompanying drawings.

Figure 19:
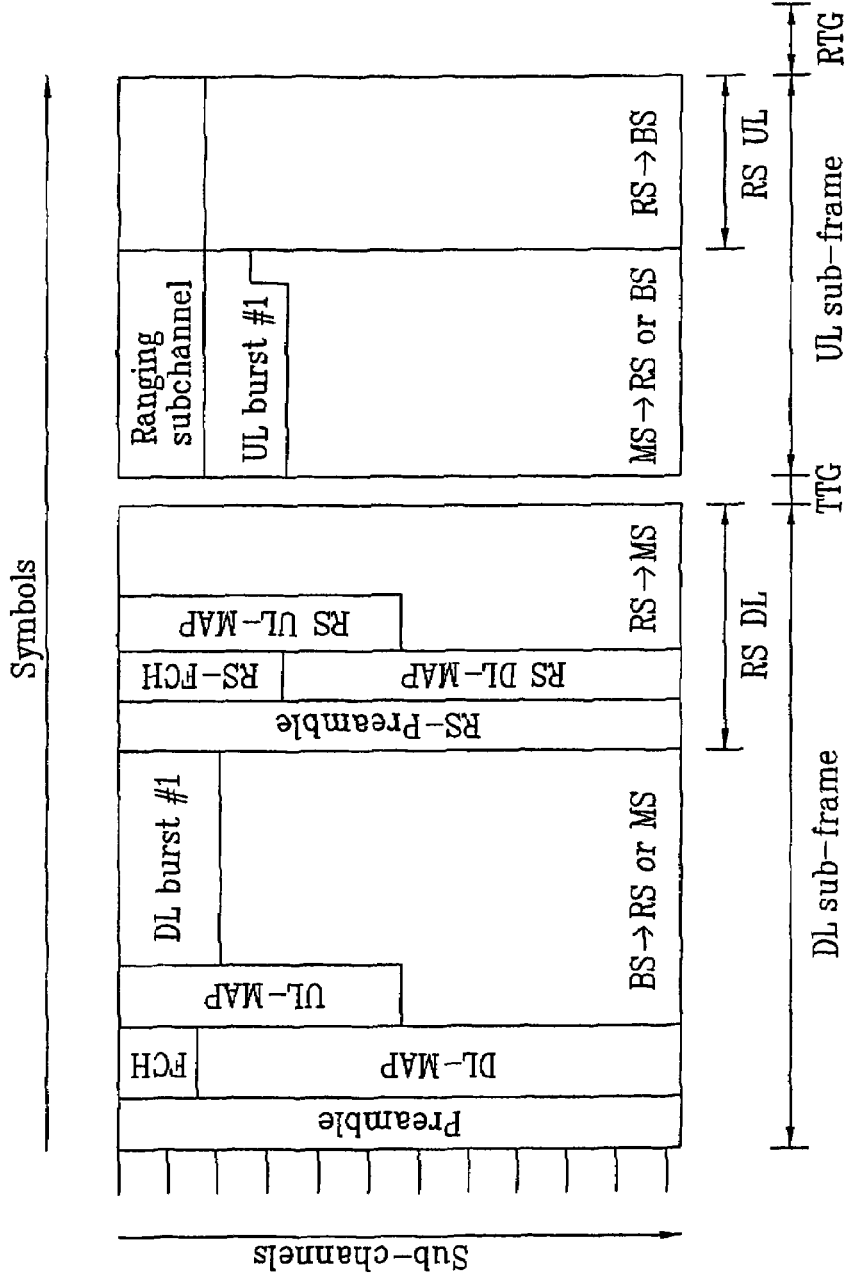
FIG. 19 is a schematic view illustrating a frame structure suggested for communication through a relay station.

If communication is performed between the base station and the mobile subscriber station through the relay station, a region for performing communication between the relay station and the mobile subscriber station should be allocated to the frame, wherein the region is referred to as 'relay station region (or RS region).' FIG. 19 is a schematic view illustrating a frame structure suggested for communication through the relay station. In FIG. 19, a portion 'RS DL' represents a downlink relay station region while a portion 'RS UL' represents an uplink relay station region.

The data transmitted from the base station to the relay station is allocated to the downlink of the existing frame in a burst mode while the data transmitted from the relay station to the mobile subscriber station is allocated to the downlink relay station region. In the case that the mobile subscriber station has data to be transmitted to the base station, the data is transmitted through the region allocated to the mobile subscriber station from the uplink region indicated by the uplink map (UL-MAP) of the relay station, and the relay station transmits the data received from the mobile subscriber station to the base station through the uplink relay station region (RS UL).

The downlink relay station region includes a length of the relay station downlink and uplink map (RS DL/UL MAP), RS-FCH (frame controller header) including coding information, an RS-preamble region for synchronizing with the mobile subscriber station, relay station downlink and uplink map regions, and relay station downlink and uplink data burst regions. The RS-preamble may have different sequences per relay station. The map structure of the relay station region and burst allocation within the relay station region are determined by the base station.

Figure 20:
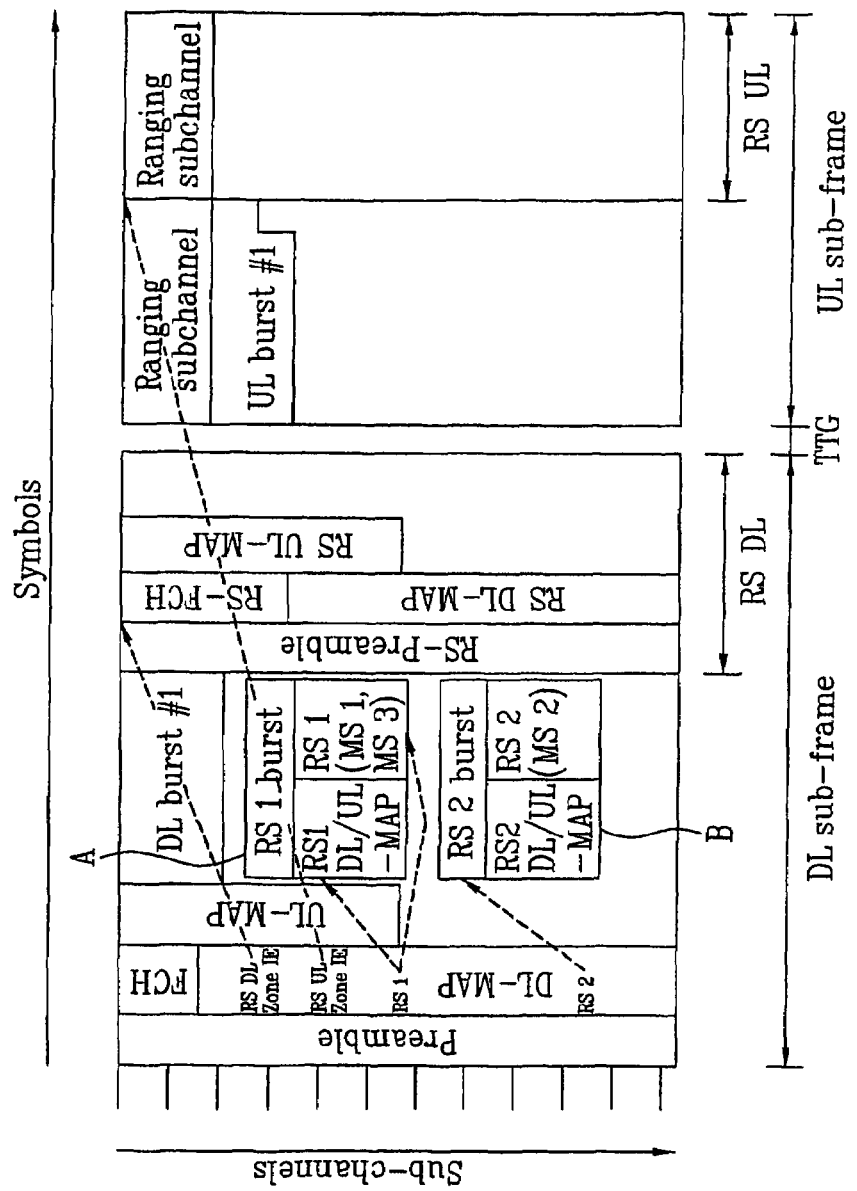
FIGS. 20 and 21 are schematic views illustrating frames transmitted from a base station and a relay station to a mobile subscriber station.
Figure 21:
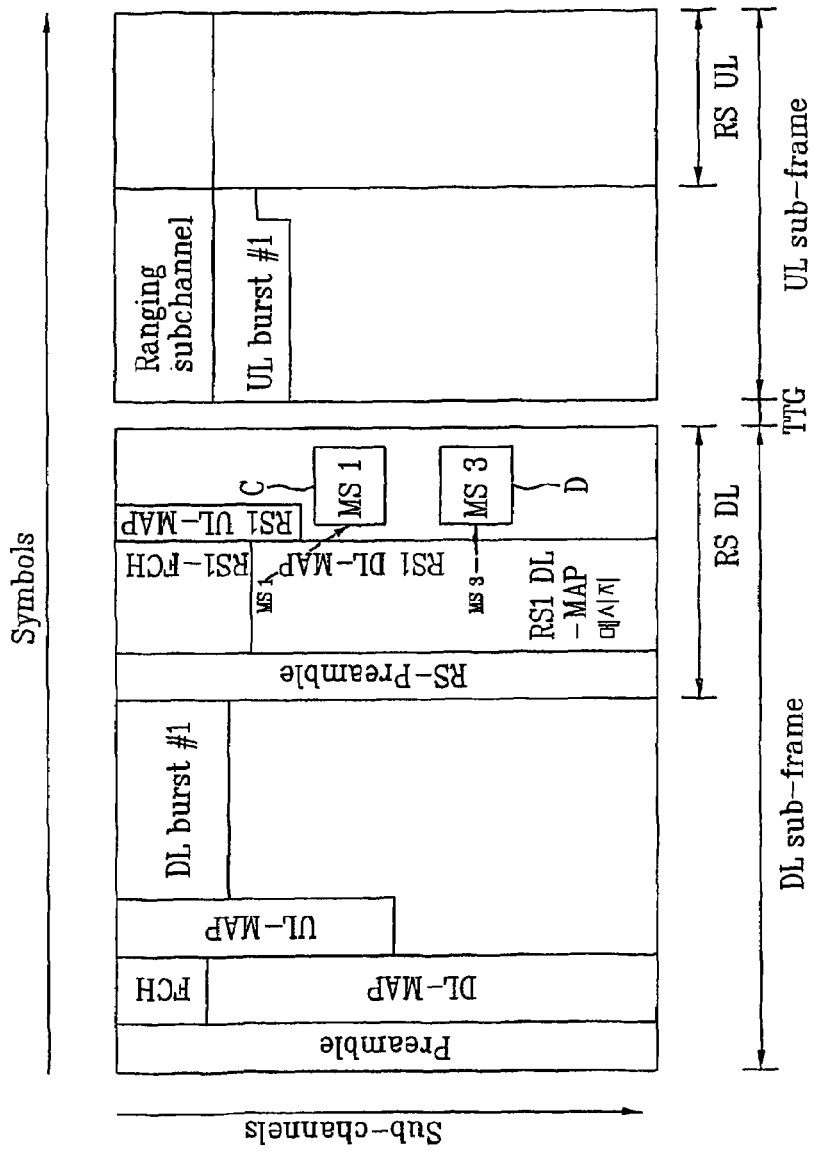

FIGS. 20 and 21 are schematic views illustrating frames transmitted and received from the base station and the relay station to the mobile subscriber station in accordance with the preferred embodiment of the present invention.

FIG. 20 illustrates a structure of the nth frame transmitted and received between the base station and the relay stations RS 1 and RS 2. In the OFDM or OFDMA communication system, the frame can be defined by a two-dimensional plane of a horizontal axis of a symbol (or time) and a vertical axis of a subchannel (or frequency). The whole frame is comprised of a downlink sub-frame (DL sub-frame) and an uplink sub-frame (UL sub-frame).

The base station includes identification information for designating the downlink and uplink relay station regions within the frame, in the downlink map (DL-MAP), and transmits the identification information to the relay station and the mobile subscriber station, wherein the identification information may be included in the relay station downlink region information element (RS DL Zone IE) and the relay station uplink region information element (RS UL Zone IE).

The identification information for the relay station region includes identification information of a start point of the relay station region. Also, the identification information may include identification information of a start point of the relay station region during at least one next frame as well as identification information of a start point of the relay station region during the current frame. In FIG. 20, the start point of the relay station region represents a start point of the relay station preamble (RS-preamble). The identification information for the relay station region may be included in the data bursts A and B allocated to each relay station. The positions of the data bursts allocated to each relay station are designated by a message included in the downlink map (DL-MAP) region of the frame.

The base station transmits the relay station downlink map (RS DL-MAP) information and the relay station uplink map (RS UL-MAP) information to each relay station. The relay station downlink map information and the relay station uplink map information include a frame number (for example, (n+1)th frame) which is to transmit data of the mobile subscriber station received from the base station, position information (for example, symbol and subchannel offset value based on the RS-preamble) of RS DL/UL MAP of each relay station, RS DL/UL MAP length, FCH information including coding information, and downlink and uplink map information for each mobile subscriber station in the downlink and uplink relay station regions. The downlink and uplink map information for each mobile subscriber station includes downlink data burst allocation information and uplink data burst allocation information, wherein the downlink data burst allows each relay station to transmit data to each mobile subscriber station and the uplink data burst allows each mobile subscriber station to transmit data to each relay station.

The base station may include the relay station downlink and uplink map information in the downlink map (DL-MAP) region and the uplink map (UL-MAP) region along with the downlink and uplink map information allocated to the mobile subscriber station which directly communicates with the base station, without through the relay station. Each relay station includes the relay station uplink/downlink map information included in the downlink map region and the uplink map region in the relay station downlink map region (RS DL-MAP Zone) and the relay station uplink map region (RS DL-MAP Zone) of the downlink relay station region (RS DL) or the uplink relay station region (RS UL), and then transmits the map information to the mobile subscriber station. Each mobile subscriber station is allocated with the downlink data burst for receiving data from the relay station and the uplink data burst for transmitting data to the relay station in accordance with the relay station downlink/uplink map information included in the relay station downlink map region (RS DL-MAP Zone) and the relay station uplink map region (RS UL-MAP Zone).

The base station can include the relay station downlink and uplink map information in the data burst allocated to each relay station and then can transmit the map information to each relay station. In other words, there exist data to be transmitted to the mobile subscriber stations MS 1, MS 2, and MS 3 through the relay stations RS 1 and RS 2, the base station allocates the data burst of each relay station to the downlink data burst region and transmits the data through the allocated data burst. In FIG. 20, a region 'A' represents a data burst including data to be transmitted from the base station to the mobile subscriber stations MS 1 and MS 3 through the relay station RS 1 and is allocated to the relay station RS 1, and a region 'B' represents a data burst including data to be transmitted from the base station to the mobile subscriber station MS 2 through the relay station RS 2 and is allocated to the relay station RS 2. At this time, the data bursts A and B respectively allocated to the relay stations RS 1 and RS 2 include the relay station downlink and uplink map (RS1 DL/UL-MAP and RS2 DL/UL-MAP) information along with the data to be transmitted to the mobile subscriber stations. The base station designates the positions of the data bursts A and B allocated to the relay stations RS 1 and RS 2 and a frame number for transmitting data to the mobile subscriber station in the relay stations RS 1 and RS 2 through the DL-MAP information element (IE) of the downlink map (DL-MAP) region.

The relay stations RS 1 and RS 2 identify the positions of the data bursts A and B allocated thereto through the DL-MAP information element, and transmit the downlink relay station region to the mobile subscriber station by using the relay station downlink and uplink map (RS1 DL/UL-MAP and RS2 DL/UL-MAP) information included in their corresponding data bursts.

FIG. 21 illustrates a structure of a frame ((n+1)th frame) designated by the base station to allow the relay station RS 1 to transmit the data to the mobile subscriber stations MS 1 and MS 3, i.e., a structure of the (n+1)th frame transmitted from the relay station RS 1 to the mobile subscriber stations MS 1 and MS 3. Referring to FIG. 21, the relay station RS 1 includes the relay station downlink and uplink map (RS1 DL/UL-MAP) information in the RS 1 UL-MAP region and the RS 1 DL-MAP region of the relay station downlink region, wherein the relay station downlink and uplink map (RS1 DL/UL-MAP) information is included in the data burst A allocated from the base station to the relay station RS 1. The relay station RS 1 includes data to be transmitted to respective mobile subscriber stations MS 1 and MS 3 in data bursts C and D for the respective mobile subscriber stations MS 1 and MS 3 indicated by the relay station downlink and uplink map information. Then, the relay station RS 1 transmits the map information and the data.

The relay station RS 1 transmits a message including the identification information for the relay station region to the mobile subscriber station through the relay station downlink map (RS1 DL-MAP) region, wherein the identification information is received from the base station. As described above, the identification information for the relay station region includes identification information of a start point of the relay station region during at least one next frame as well as identification information of a start point of the relay station region during the current frame. The start point of the relay station region represents a start point of the relay station preamble (RS-preamble).

Table 15 illustrates an example of a data format of a message (RSL DL-MAP message) including identification information of the start point of the relay station preamble.

TABLE 15

| Syntax | Size (bits) | Notes |
|---|---|---|
| RS1_DL-MAP_Message_Format( ){ | | |
| Management Message Type=2 | 8 | |
| PHY Synchronization Field | variable | See appropriate PHY specification |
| DCD Count | 8 | |
| Base Station ID | 48 | |
| Current Preamble Offset | 8 | |
| Next Preamble Offset | 8 | |
| Begin PHY Specific Section{ | | See applicable PHY section |
| For(i=1; i<=n; i++){ | | For each DL-MAP element 1 to n |
| DL-MAP_IE( ) | variable | See corresponding PHY specification |
| } | | |
| } | | |
| if !(byte boundary){ | | |
| Padding Nibble | 4 | Padding to reach byte boundary. |
| } | | |
| } | | |

In Table 15, identification information of the start point of the relay station preamble is expressed by a 'Current Preamble Offset' field and a 'Next Preamble Offset' field. The 'Current Preamble Offset' field means symbol offset from a specific reference point to the start point of the current relay station preamble (RS-preamble), and the 'Next Preamble Offset' field means symbol offset from a specific reference point to the start point of the relay station preamble during the next frame. Although the specific reference point preferably corresponds to the symbol position of the message including the identification information of the start point of the relay station preamble, it is not limited to such position.

The identification information of the start point of the relay station preamble may be expressed by various methods in addition to the example of Table 15. For example, the 'Current Preamble Offset' field may mean symbol offset from a specific reference point to the start point of the current relay station preamble (RS-preamble), and the 'Next Preamble Offset' field may mean symbol offset from the start point of the relay station preamble during the current frame to the start point of the relay station preamble during the next frame. The identification information may include the 'Next Preamble Offset' only. Also, although the identification information may designate the start point of the relay station preamble during a single next frame after the current frame, the identification information may designate the start point of the relay station preamble during two or more next frames.

Since the mobile subscriber station can easily retrieve the start point of the relay station preamble from the identification information during the next frame, there is no need to synchronize with the relay station preamble to retrieve the relay station region for every frame, and the start point of the relay station region can be retrieved quickly aid exactly even in the case that the position of the relay station region is varied.

As described above, the communication method using the relay station in the mobile communication system according to the present invention has the following advantages.

First, in the mobile communication system provided with the relay station, data relay communication can efficiently be performed.

Second, the data can be transmitted to mobile subscriber stations corresponding to a shadow area by relay communication, and higher throughput can be supported to mobile subscriber stations not corresponding to the shadow area.

Third, in the case that communication is performed between the base station and the mobile subscriber station through the relay station, the communication resource allocation procedure can clearly be defined and the communication resource can efficiently be allocated.

Finally, the mobile subscriber station does not need to synchronize with the relay station preamble to retrieve the relay station region for every frame, and the start point of the relay station region can be retrieved quickly and exactly even in the case that the position of the relay station region is varied.

INDUSTRIAL APPLICABILITY

The present invention can be applied to the mobile communication system such as a cellular mobile communication system and a wireless Internet system.

What is claimed is:

1. A method for a base station in support of relaying data in a communication system including a relay station (RS), the method comprising:
   transmitting a radio resource allocation message including first downlink map (DL-MAP) information and second DL-MAP information, the first DL-MAP information relating to radio resource allocation for transmitting data from the base station to the relay station by using an $n^{th}$ frame, and the second DL-MAP information relating to radio resource allocation for transmitting data from the relay station to a mobile subscriber station by using an $(n+k)^{th}$ frame; and
   transmitting data from the base station to the relay station during the $n^{th}$ frame by using the radio resource allocated in accordance with the first DL-MAP information,
   wherein the first DL-MAP and the second DL-MAP have the same format,
   wherein each of the first DL-MAP information and the second DL-MAP information has a field indicating whether it is the first DL-MAP information or the second DL-MAP information, and
   wherein the value of k is equal to 1.

2. The method as claimed in claim 1, wherein the radio resource is allocated in a burst mode.

3. The method as claimed in claim 1, wherein the radio resource allocated by the first DL-MAP information and the radio resource allocated by the second DL-MAP information are exclusive from each other.

4. A method for relaying data transmitted from a base station to a mobile subscriber station through a relay station (RS) in a communication system, the method comprising:
   receiving a radio resource allocation message including first downlink map (DL-MAP) information and second DL-MAP information, the first DL-MAP information relating to radio resource allocation for transmitting data from the base station to a relay station by using an $n^{th}$ frame, and the second DL-MAP information relating to radio resource allocation for transmitting data from the relay station to a mobile subscriber station by using an $(n+k)^{th}$ frame;

receiving data transmitted from the base station during the nth frame by using the radio resource allocated in accordance with the first DL-MAP information;

decoding the data;

encoding the decoded data; and transmitting the data to the mobile subscriber station during the $(n+k)^{th}$ frame by using the radio resource allocated in accordance with the second DL-MAP information, wherein the first DL-MAP and the second DL-MAP have the same format, wherein each of the first DL-MAP information and the second DL-MAP information has a field indicating whether it is the first DL-MAP information or the second DL-MAP information, and wherein the value of k is equal to 1.

5. A method of relaying, at a relay station, data transmitted from a base station to a mobile subscriber station, the method comprising:

receiving a radio resource allocation message including first downlink map (DL-MAP) information and second DL-MAP information, the first DL-MAP information relating to radio resource allocation for transmitting data from the base station to the relay station by using an $n^{th}$ frame, and the second DL-MAP information relating to radio resource allocation for transmitting data from the relay station to a mobile subscriber station by using an $(n+k)^{th}$ frame;

receiving data from the base station by using the radio resource allocated by the first DL-MAP information during the $n^{th}$ frame;

transmitting downlink radio resource allocation information to mobile subscriber stations within a zone of the relay station by using a DL-MAP of the $(n+k)^{th}$ frame; and respectively transmitting data to the mobile subscriber stations within the relay station zone during the $(n+k)^{th}$ frame by using a radio resource allocated by the second DL-MAP information, wherein the first DL-MAP and the second DL-MAP have the same format, wherein each of the first DL-MAP information and the second DL-MAP information has a field indicating whether it is the first DL-MAP information or the second DL-MAP information, and wherein the value of k is equal to 1.

6. The method as claimed in claim 5, wherein the radio resource allocated by the first DL-MAP information and the radio resource allocated by the second DL-MAP information are exclusive from each other.

7. The method as claimed in claim 5, wherein the downlink radio resource allocation information corresponds to the radio resource allocated by the second DL-MAP information.

* * * * *